US010785520B2

(12) United States Patent
Margolies et al.

(10) Patent No.: US 10,785,520 B2
(45) Date of Patent: Sep. 22, 2020

(54) METHOD AND APPARATUS FOR WIRELESS DISTRIBUTION OF TV SERVICES

(71) Applicants: AT&T INTELLECTUAL PROPERTY I, L.P., Atlanta, GA (US); NEW YORK UNIVERSITY, New York, NY (US)

(72) Inventors: Robert Margolies, Wayne, NJ (US); Rittwik Jana, Montville, NJ (US); Shivendra Singh Panwar, New York, NY (US); Rajeev Kumar, New York, NY (US); Yong Liu, New York, NY (US)

(73) Assignees: AT&T Intellectual Property I, L.P., Atlanta, GA (US); NEW YORK UNIVERSITY, New York, NY (US)

( * ) Notice: Subject to any disclaimer, the term of this patent is extended or adjusted under 35 U.S.C. 154(b) by 266 days.

(21) Appl. No.: 15/814,798

(22) Filed: Nov. 16, 2017

(65) Prior Publication Data

US 2018/0316954 A1 Nov. 1, 2018

Related U.S. Application Data

(60) Provisional application No. 62/491,822, filed on Apr. 28, 2017.

(51) Int. Cl.
*G06F 15/16* (2006.01)
*H04N 21/24* (2011.01)
(Continued)

(52) U.S. Cl.
CPC ....... *H04N 21/2402* (2013.01); *H04L 45/122* (2013.01); *H04N 21/25841* (2013.01);
(Continued)

(58) Field of Classification Search
USPC .......................................................... 709/227
See application file for complete search history.

(56) References Cited

U.S. PATENT DOCUMENTS 6,925,285 B2 * 8/2005 Kim ................. H03M 13/1515
375/E7.002
8,458,742 B2 * 6/2013 Parker ................. H04N 7/1675
725/24

(Continued)

OTHER PUBLICATIONS

"Cost to Install a Satellite Dish", http://www.homewyse.com/services/cost_to_install_satellite_dish.html, accessed Jul. 28, 2016, 2016, 4 pages.

(Continued)

*Primary Examiner* — Alicia Baturay
(74) *Attorney, Agent, or Firm* — Guntin & Gust, PLC; John G. Rauch

(57) ABSTRACT

Aspects of the subject disclosure may include, for example, a wireless framework for delivering TV services. The wireless framework can include a mix of wireless access technologies (e.g. Satellite, WiFi and/or LTE overlay links). One or more aspects of the subject disclosure include injecting TV content into the network at a few locations (e.g., residential locations) using satellite antennas (e.g., satellite dishes). The content is then further distributed to other homes using a house-to-house WiFi network and/or via an overlay LTE network. Other embodiments are disclosed.

20 Claims, 22 Drawing Sheets

(51) Int. Cl.
*H04L 12/733* (2013.01)
*H04N 21/643* (2011.01)
*H04N 21/442* (2011.01)
*H04N 21/258* (2011.01)
*H04N 21/45* (2011.01)
*H04N 21/4363* (2011.01)
*H04N 21/61* (2011.01)
*H04W 40/20* (2009.01)
*H04L 12/721* (2013.01)

(52) U.S. Cl.
CPC . *H04N 21/43637* (2013.01); *H04N 21/44209* (2013.01); *H04N 21/4524* (2013.01); *H04N 21/6143* (2013.01); *H04N 21/64322* (2013.01); *H04W 40/20* (2013.01); *H04L 45/123* (2013.01)

(56) References Cited

U.S. PATENT DOCUMENTS

| | | | |
|---|---|---|---|
| 9,077,649 | B2 | 7/2015 | Kotecha et al. |
| 9,094,946 | B2 | 7/2015 | Aguirre et al. |
| 9,185,466 | B2 | 11/2015 | Chadha |
| 9,223,473 | B2 | 12/2015 | Mathur |
| 9,380,322 | B2 | 6/2016 | Kotecha et al. |
| 9,485,667 | B2 | 11/2016 | Kamdar et al. |
| 10,250,345 | B2 * | 4/2019 | Margolies ............... H04H 20/63 |
| 10,432,296 | B2 * | 10/2019 | Martch ............... H04N 21/4263 |
| 2003/0064679 | A1 | 4/2003 | Kim |
| 2010/0169937 | A1 * | 7/2010 | Atwal ............... H04N 21/43637 725/68 |
| 2010/0313232 | A1 | 12/2010 | Norin et al. |
| 2010/0333131 | A1 | 12/2010 | Parker et al. |
| 2015/0124616 | A1 | 5/2015 | Lohman et al. |
| 2015/0327068 | A1 * | 11/2015 | Hunt ....................... H04L 63/10 726/4 |
| 2016/0134544 | A1 | 5/2016 | Roy et al. |
| 2016/0191147 | A1 | 6/2016 | Martch |
| 2016/0301456 | A1 | 10/2016 | Clevorn et al. |
| 2018/0316448 | A1 | 11/2018 | Margolies et al. |

OTHER PUBLICATIONS

"LTE; Evolved Universal Terrestrial Radio Access (E-UTRA); Base Station (BS) radio transmission and reception", Technical Specification; (3GPP TS 36.104 version 10.2.0 Release 10); 3rd Generation Partnership project Std. 3GPP TS 36.104 V10.20.0, 2011, 103 pages.
"Part 11: Wireless LAN Medium Access Control (MAC) and Physical Layer (PHY) Specifications", IEEE Std. 802.11b, 1999, 96 pages.
Abdollahpouri, Alireza et al., "Unicast versus Multicast for Live TV Delivery in Networks with Tree Topology", Proc. WWIC, ACM, 2010, 14 pages.
Baliga, Jayant et al., "Energy Consumption of the Internet", Proc. COIN-ACOFT, Jun. 2007, 3 pages.
Brunnstrom, K. et al., "Future Media Distribution: An Innovation Agenda for Digital Media Distribution", Mar. 2015, 32 pages.
Clarke, Richard N., "Costs of Neutral/Unmanaged IP Networks", Review of Network Economics, vol. 8, No. 1, pp. 61-89, Nov. 2012, 29 pages.
Garcia, Miguel et al., "IPTV Distribution Network Access System Using WiMAX and WLAN Technologies", Proc. UPGRADE-CN, ACM, 2009, 10 pages.
Gary, Kim, "How Much Does Rural Fiber Really Cost?", http://blog.performantnetworks.com/2012/11/how-much-does-rural-fiber-really-cost.html, Nov. 2012, 4 pages.
Gidlund, Mikael et al., "VoIP and IPTV Distribution over Wireless Mesh Networks in Indoor Environment", IEEE Trans. Consum. Electron., vol. 54, No. 4, pp. 1665-1671, Nov. 2008, 7 pages.
Gouveia, Luis, "Multicommodity Flow Models for Spanning Trees with Hop Constraints", European Journal of Operational Research, vol. 95, No. 1, pp. 178-190, 1996, 13 pages.
Grant, Michael C. et al., "CVX: Matlab software for disciplined convex programming, version 2.1", http://cvxr.com/cvx, (citing page http://cvxr.com/cvx/citing/), Mar. 2014, 99 pages.
Grant, Michael C. et al., "Graph Implementations for Nonsmooth Convex Programs", Recent Advances in Learning and Control. Springer-Verlag Limited, pp. 95-110, 2008, 16 pages.
Hei, Xiaojun et al., "A Measurement Study of a Large-Scale P2P IPTV System", IEEE Transactions on MultiMedia, vol. 9, No. 8, Dec. 2007, 16 pages.
Kerpez, Ken et al., "IPTV Service Assurance", IEEE Communications Magazine, vol. 44, No. 9, pp. 166-172, Sep. 2006, 7 pages.
Lee, Kye-Hwan et al., "QoS-Guaranteed IPTV Service Provisioning in IEEE 802.11e WLAN-based Home Network", Proc. NOMSW, Apr. 2008, 6 pages.
Li, Xinrong, "Collaborative Localization With Received-Signal Strength in Wireless Sensor Networks", IEEE Transactions on Vehicular Technology, vol. 56, No. 6, Nov. 2007, 11 pages.
Liu, Yali et al., "IPTV System Design: An ISP's Perspective", Proc. CyberC, Oct. 2011, 7 pages.
Mogensen, Preben et al., "LTE Capacity compared to the Shannon Bound", Proc. IEEE VTC, Apr. 2007, 5 pages.
Paul, P. et al., "Characterizing WiFi Link Performance in Open Outdoor Networks", Proc. IEEE SECON, Jun. 2011, 9 pages.
Paul, Pragyansmita et al., "Survey of Multicast Routing Algorithms and Protocols", Proc. of ACM ICCC, Aug. 2002, 27 pages.
She, James et al., "IPTV over WiMAX: Key Success Factors, Challenges, and Solutions", IEEE Communications Magazine, vol. 45, No. 8, pp. 87-93, Aug. 2007, 7 pages.
Shihab, Emad et al., "Wireless Mesh Networks for In-Home IPTV Distribution", IEEE Network, vol. 22, No. 1, pp. 52-57, Jan. 2008, 6 pages.
Singh, Harkirat et al., "IPTV over Wireless LAN: Promises and Challenges", Proc. IEEE CCNC, Jan. 2008, 6 pages.
Wittig, Manfred et al., "Satellite Onboard Processing for Multimedia Applications", IEEE Communications Magazine, Jun. 2000, 7 pages.
Xiao, Yang et al., "Internet Protocol Television (IPTV): The Killer Application for the Next-Generation Internet", IEEE Communications Magazine, vol. 45, No. 11, pp. 126-134, Nov. 2007, 9 pages.
Kumar, Rajeev et al., "WiLiTV: A Low-Cost Wireless Framework for Live TV Services", Tech. Rep. https://arxiv.org/pdf/1701.02669v1.pdf, Jan. 2017, 10 pages.

* cited by examiner

200

510

710

720

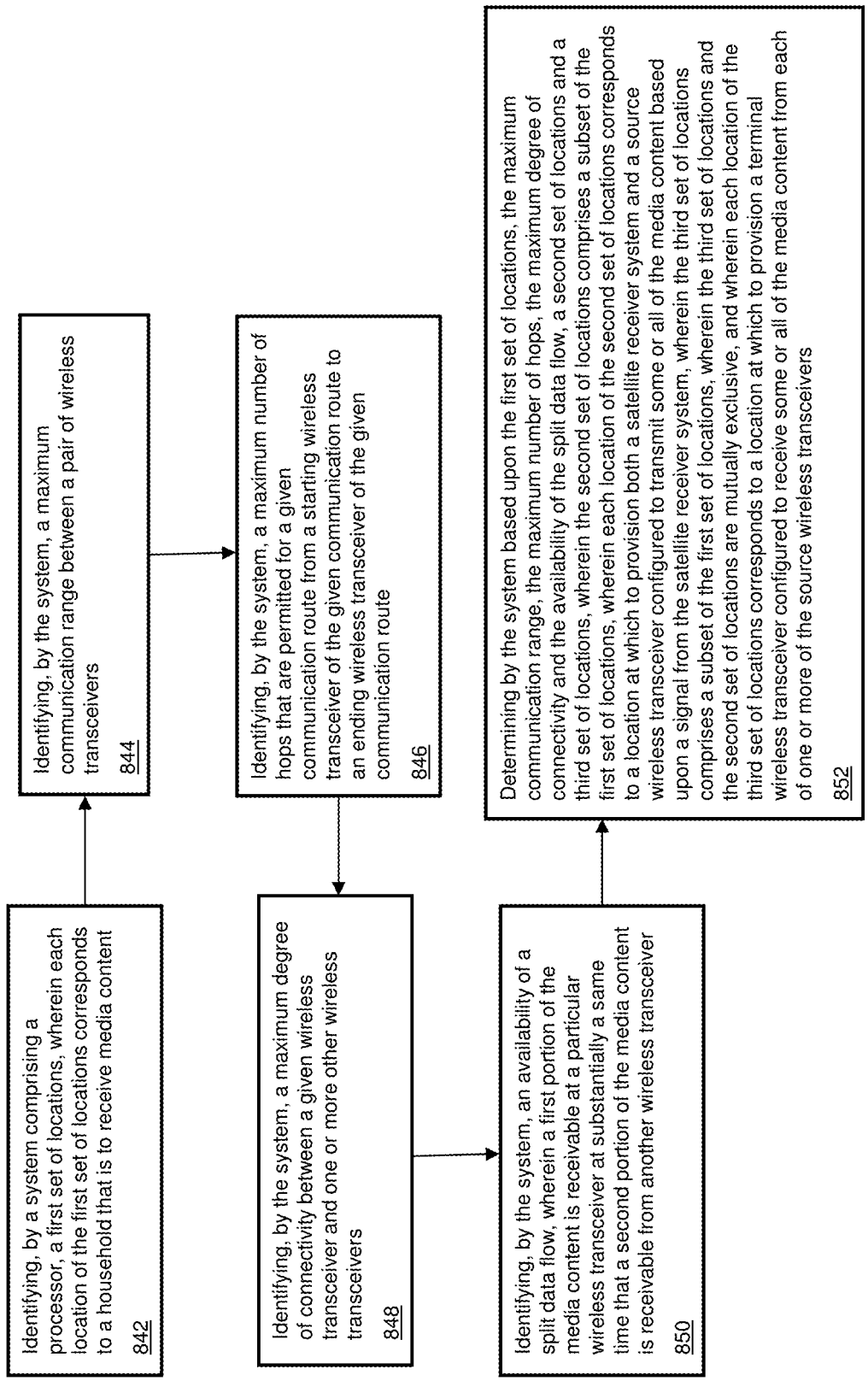

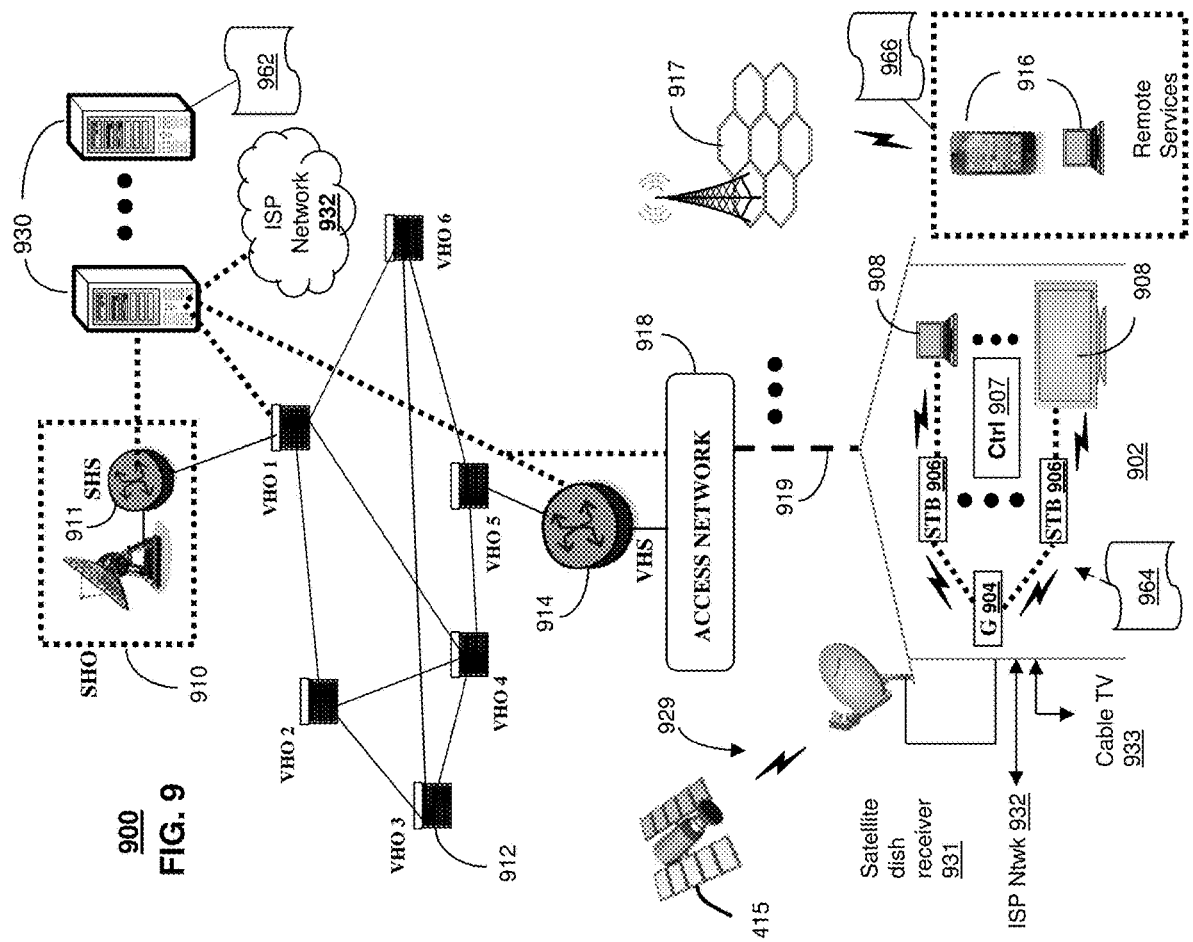

METHOD AND APPARATUS FOR WIRELESS DISTRIBUTION OF TV SERVICES

CROSS-REFERENCE TO RELATED APPLICATIONS

This application claims the benefit of U.S. Provisional Application Ser. No. 62/491,822, filed Apr. 28, 2017, which is incorporated by reference herein in its entirety including Appendices.

FIELD OF THE DISCLOSURE

The subject disclosure relates to a method and apparatus for wireless distribution of television (TV) services.

BACKGROUND

Today, the majority of households receive TV content via cable/fiber, IP network, or satellite. In one example, Internet Protocol TV ("IPTV") streams live TV content from a few regional hub offices to set-top boxes over either a dedicated private network or over-the-top via the core IP network. To satisfy Quality of Service ("QoS") requirements, IPTV must be provisioned with a sufficiently high bandwidth in the distribution network.

BRIEF DESCRIPTION OF THE DRAWINGS

Reference will now be made to the accompanying drawings, which are not necessarily drawn to scale, and wherein:

in FIG. 5B, the number of streams=2; in FIG. 5C, the number of streams=3; in FIG. 5D, the number of streams=4);

FIG. 6B shows WiFi over two hops; FIG. 6C shows WiFi and LTE over one hop; FIG. 6D shows WiFi and LTE over two hops);

FIG. 7B shows WiFi over two hops; FIG. 7C shows WiFi and LTE over one hop; FIG. 7D shows WiFi and LTE over two hops);

FIG. 8B depicts an illustrative embodiment of a method used in portions of the system described in FIG. 1;

FIG. 9 depicts an illustrative embodiment of a communication system that provides media services (such as, for example, TV distribution services of the type described with reference to FIG. 1);

DETAILED DESCRIPTION

Figure 1:
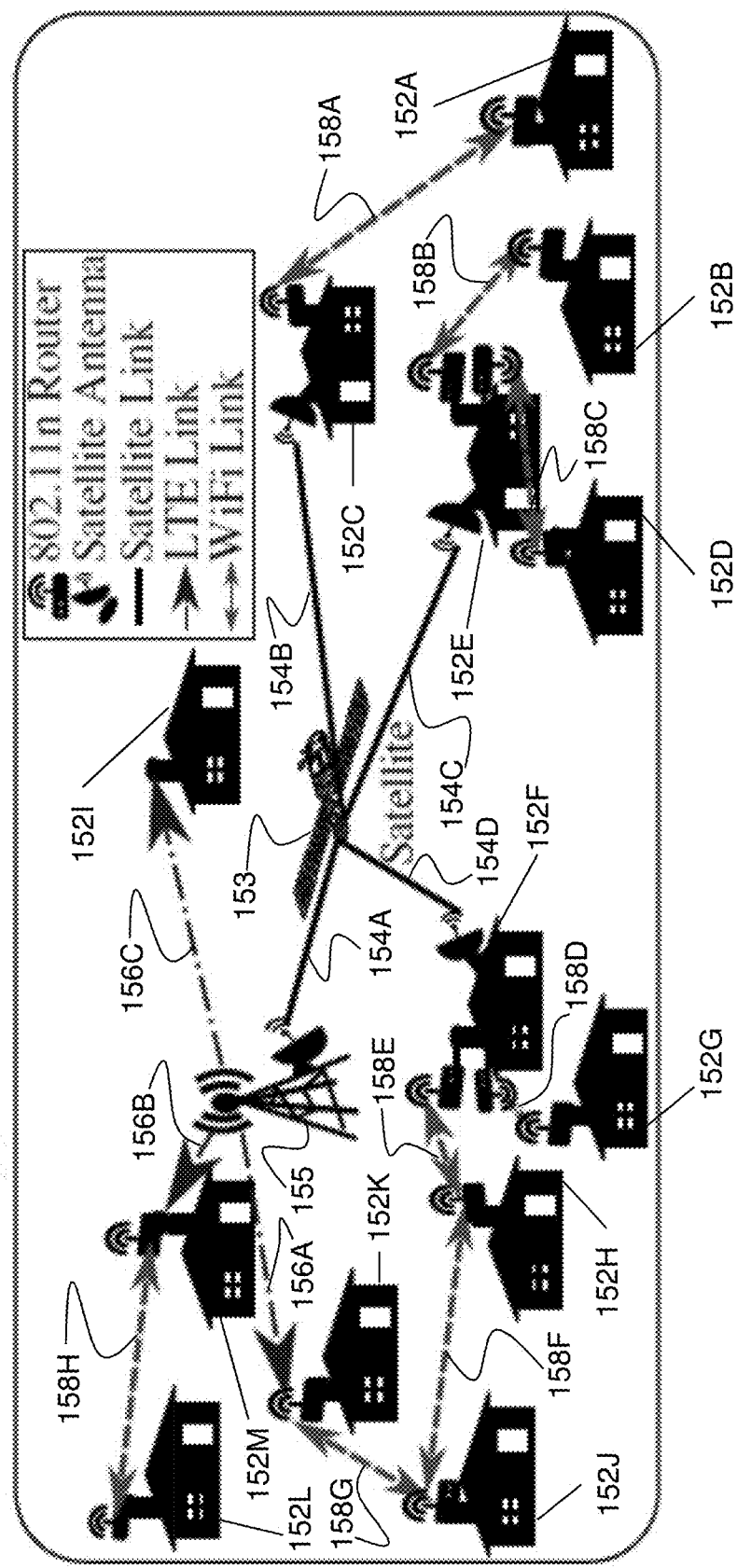
FIG. 1 depicts an illustrative embodiment of a wireless distribution system.

The subject disclosure describes, among other things, illustrative embodiments for wireless distribution of media content (e.g., TV services). Other embodiments are described in the subject disclosure.

One or more aspects of the subject disclosure include a cost-efficient wireless framework (sometimes referred to herein as "WiLiTV") for delivering TV services (e.g., live TV services). The wireless framework can include a mix of wireless access technologies (e.g. Satellite, WiFi and/or LTE overlay links).

One or more aspects of the subject disclosure include injecting TV content (e.g., live TV content) into the network at a few locations (e.g., residential locations) using satellite antennas (e.g., satellite dishes). The content is then further distributed to other homes using a house-to-house WiFi network and/or via an overlay LTE network.

One or more aspects of the subject disclosure include techniques to construct a TV distribution network (e.g., optimal TV distribution network) with the minimum number of satellite injection points, while preserving the highest Quality of Experience ("QoE"), for different neighborhood densities.

Various embodiments described herein provide an all wireless solution to deliver live TV services. Some service providers now have the benefit of leveraging multiple access technologies to distribute live TV content (e.g. satellite, WiFi and LTE). Various embodiments can capitalize on this opportunity to create a distribution infrastructure that is optimized to serve large residential neighborhoods with a minimal number of TV content injection points. Solved herein are various multicommodity optimization flow problems to model various scenarios. Using real data from a national TV service provider, it is shown that the architecture can save provisioning costs by between, for example, 75% to 90%. Presented are experiments using four different representative residential neighborhoods with time varying traffic demands. It is shown herein that there is an optimum strategy for placing the satellite dish antennas combined with an appropriate selection of WiFi routes to meet the time-varying demand of subscribers/households.

As described herein is a WiLiTV architecture in which content can be first delivered to a community through a few selected houses (with satellite antennas) and LTE Base Stations (with satellite antennas), and is then distributed to other houses using WiFi and LTE relays.

As described herein various embodiments provide a content distribution architecture in which content is first delivered via satellite to a community (the content is delivered to a satellite antenna at each of a few selected houses in the community and/or a satellite antenna at each of a few selected base stations (e.g., LTE base stations) in the community). After receipt of the content by the satellite antennas, the content is then distributed to the remainder of the houses in the community using, e.g., WiFi (between the houses) and/or e.g., LTE relays (between the base stations and the houses). Other embodiments include the following: Computer models for determining satellite antenna provisioning. That is, which houses and/or base stations are to have installed thereon satellite antennas for download of all content (e.g., all channels)? Computer models for determining relay routing. That is, how should content (e.g., a particular channel) be routed from a satellite antenna location to a target house? An implementation in which only WiFi routing is used. An implementation in which WiFi routing is used along with LTE links from one or more base stations. An implementation with fixed (not time-varying) demand at the target houses. An implementation with time-varying demand at the target houses. An implementation with dynamic satellite provisioning and dynamic relay routing. An implementation with static satellite provisioning and dynamic relay routing. An implementation with static satellite provisioning and static relay routing. An implementation with a limited number of "hops" between houses. An implementation in which content is delivered to a given house via a single data stream. An implementation in which content is delivered to a given house via a plurality of data streams (e.g., each steam taking a different path through the network of houses).

Referring now to FIG. 1, a discussion of an example of a system model and associated assumptions according to one embodiment will now be presented. As illustrated in FIG. 1 (showing overall system 150), the wireless distribution network according to this embodiment for TV (e.g., live TV) consists of three types of nodes:

1) A relatively small number of households (see 152C, 152E and 152F) equipped with satellite antennas act as the injection points (see satellite links 154B, 154C and 154A) for TV content. These households also have WiFi access points for relaying content (see WiFi links 158A, 158B, 158C, 158D, 158E) to WiFi-only households.

2) LTE Base Stations (see, e.g., 155), each quipped with a satellite antenna, act as additional TV injection points, and can deliver content to LTE-enabled households over unused LTE bands (see LTE links 156A, 156B and 156C).

3) Regular households are equipped with WiFi access points and LTE receivers. A regular household receives TV content from WiFi and/or LTE. It can also relay the received TV content to other regular households (see WiFi links 158A, 158B, 158C, 158D, 158E, 158F, 158G, and 158H).

As a result, a household can receive TV content by the following methods: (i) directly from satellite antenna; (ii) through WiFi relay; (iii) through LTE (direct and/or relay); and (iv) through both LTE (direct and/or relay) and WiFi relay(s). FIG. 1 illustrates the TV reception and relay methods at each node. Moreover, content can be relayed using either all-or-nothing flows or fractional flows. In all-or-nothing flows, a household receives all content from a single source/relay node; using fractional flows, a household receives content simultaneously from multiple sources/relays. TV traffic demand at household i is denoted by $\delta_i$ (in Mbps). The demand can also be expressed as $\psi_i*b$, where $\psi_i$ is the number of channels being demanded at household i and b is the capacity required per channel in Mbps.

Reference will now be made to a specific example of Relay Using WiFi. In this example, the WiFi relay network is modeled as an undirected graph $\mathcal{G}=(\mathcal{V},\mathcal{E})$, where $\mathcal{V}$ is the set of households and $\mathcal{E}$ is the set of WiFi links between households. WiFi transmissions between neighboring households operate on orthogonal channels, and are highly directional by making use of beamforming techniques. Point-to-point connections among households avoid wasting airtime in collision avoidance. Furthermore, the households are bounded by a degree of connectivity represented by $\rho$, i.e., a household has a maximum of $\rho$ point-to-point links with neighboring households. It is assumed, in this example, that all WiFi transmitters have the same transmit power P, and path losses (PL) between two households are the same along both directions ($PL_{ij}=PL_{ij}$, between household i and j). A WiFi link exists from household i to j if j lies within the communication range of i; specifically, if the received signal strength on j is greater than the receiver sensitivity, $$P-PL_{ij}\geq \xi; \forall i,j\in \mathcal{V}, \qquad (1.1)$$

where $\xi$ is the WiFi receiver sensitivity, and it is assumed to be identical for all WiFi receivers. The pathloss on a WiFi link can be calculated as $$PL(d)=\begin{cases} L_{FS}(d)+SF; \text{ if } d<d_{BP}, \\ L_{FS}(d_{BP})+35\log\left(\dfrac{d}{d_{BP}}\right)+SF; \text{ if } d\geq d_{BP}, \end{cases} \qquad (1.2)$$

where d is the distance between the transmitter and receiver, $L_{FS}(d)$ is the free space pathloss in dB, $d_{BP}$ is the breakpoint distance and SF is shadow fading in dB. The free space pathloss is defined as $$L_{FS}=20\log(d)+20\log(f)-147.5, \qquad (1.3)$$

where f is the carrier frequency. From the transmit power and pathloss computed with equations 1.2-1.3, the received signal strength at j can be calculated. The received signal strength is mapped to the corresponding modulation and coding scheme and the achievable capacity of WiFi links. Since all transmitters have the same transmit power, and pathloss is symmetric, we have $C_{ij}=C_{ji}$ for i≠j.

Reference will now be made to a specific example of Relay Using WiFi And LTE. In this example, LTE Base Stations can be additional injection points of TV content, subject to the availability of LTE bandwidth at the Base Station ("BS"). Let $\mathcal{L}$ indicate the set of LTE Base Stations having significant spare LTE resources. The network topology is augmented as $\mathcal{G}'=(\mathcal{V}',\mathcal{E}')$, with $\mathcal{V}'=(\mathcal{V}\cup\mathcal{L})$ and $\mathcal{E}'$ consisting of all WiFi and LTE links. LTE Base Stations can only be a source node. Thus, all LTE links in the topology are unidirectional from a LTE BS to households. A LTE BS uses a single channel for transmission in its coverage area. Thus, resources must be shared between households receiving TV content from the same LTE BS. TDMA is used in this example for resource sharing. Let $0\leq\lambda_{ij}\leq 1$ be the time share of the link from LTE BS $i\in\mathcal{L}$ to household $j\in\mathcal{V}$, $\Sigma\lambda_{ij}\leq 1$, $\forall i\in\mathcal{L}$. To characterize LTE links, the pathloss from LTE BS to households is calculated using, $$PL_{ij}^{LOS}=103.8+20.9\log(d) \qquad (1.4)$$

where (1.4) represents pathloss from an LTE BS to a household for the line-of-sight link. Using the maximum allowed transmit power of LTE BSs and the pathloss model, the LTE capacity is evaluated as, $$C_{ij}^{LTE}=\beta\mathcal{W}\log_2(1+\gamma SNR), \qquad (1.5)$$

where β: is the fraction of bandwidth used for data transmission while the rest is used for control signaling. Typically, β: ranges between 0:5-0:8. Similarly, γ is the fraction of received signal to noise ratio that contributes to broadband speed. Typically, γ lies between 0:5 to 0:6. For ease of reference, the notation is presented in Table I below.

TABLE I

Notation

| Parameter | Description |
|---|---|
| $\mathcal{V}, \mathcal{L}, \mathcal{V}'$ | Set of households, LTE BSs and both, respectively |
| $\mathcal{E}, \mathcal{E}'$ | Set of WiFi links, set of WiFi and LTE links |
| $\mathcal{S}, \mathcal{R}, \mathcal{T}$ | Set of Source, Relay and Terminal nodes, respectively |
| $\delta_i$ | Demand at household i |
| h | Maximum allowed hops in the topology |
| ρ | Maximum degree of connectivity at source and relay nodes |
| $C_{ij}$ | Capacity of link from node i to j |
| $u_{ij}$ | Binary variable indicating if link from node i to j is selected for content distribution |
| $X_i$ | Binary variable indicating if link from node i has a satellite antenna |
| $Y_i$ | Binary variable indicating if household i relays video to neighboring households |
| $I_{si}$ | Binary variable indicating if node i downloads video directly from virtual source s (fractional flow) |
| $f_{ij}$ | Video traffic on link from i to j (factional flow) in Mbps |
| $\lambda_{ij}$ | Time share of node j from LTE BS i |
| $\Delta_i(t)$ | Binary variable indicating if household i requires TV services at time instance t |
| $\tau_i$ | Available resources at the LTE BS i |

Reference will now be made to discussion of an example of joint optimization of satellite antenna placement and relay routing. In this example, presented are optimization models to systematically evaluate various trade-offs. Considered in this example are the following routing complexity factors:
1) Relay Hop Count: Ideally, each connected island of households only needs one source, and TV content can be relayed to all households using an arbitrary number of hops. However, TV services (e.g. live TV services) have stringent QoS (quality of service) requirements on delay, bandwidth and reliability. Multi-hop wireless relays (e.g., communication from one node, to another node, to another node, etc.) can lead to long delay, low end-to-end throughput and poor reliability. In the example presented here, relay routing is limited to be at most two hops. The cost saving with one-hop and two-hop relay routing will be considered.
2) Splittable Flows: As discussed above, with fractional flows, one household can download content from multiple relay paths from multiple sources. This can potentially increase the wireless link utilization and coverage of each source, leading to higher cost saving. As with any multi-path routing, splittable flows have to deal with delay disparity on different paths, and data transmission reliability decreases as more links and nodes are employed. The efficiency of relay routing with and without splittable flows is compared.
3) LTE Availability: A LTE BS can cover a wider range than a WiFi transmitter. But LTE bandwidth resources are expensive. Evaluated here is the coverage gain added by LTE BS (e.g., to justify or not justify its bandwidth cost).
4) Dynamic vs. Static Solution: User TV demands naturally vary over time. To maximally reduce cost, dynamic source provisioning and relay routing solutions should match the changing user demand. However, it is not practical to change satellite antenna locations on an hourly or daily basis, and reconfiguring relay routing may cause short-term service disruption.

Static solutions are easier to implement. Presented herein is a formal study of the the performance gap between dynamic and static solutions.

To systematically evaluate the impact of various source provisioning and relay routing strategies on cost saving, formulated herein (as discussed in more detail below) are a series of joint provisioning-routing optimization problems to find the lowest costs under different routing constraints.

Reference will now be made to a specific example of Fixed Demand With WiFi. In this example, the discussion starts with the simple scenario where user demands are fixed and only WiFi relays are available. This discussion makes use of the graph $\mathcal{G}$ having only WiFi transmitters and receivers. First, formulated are the optimization problems for non-splittable flow routing with one-hop and two-hop relays respectively. Then, a generalization is made to splittable flow routing with limited hop count.

Referring now in particular to the One-hop and Non-splittable Relay Routing scenario, for this scenario, it is assumed that a household is at most one hop apart from its corresponding source node. Let $X_i \in \{0, 1\}$, $\forall i \in \mathcal{V}$ be the binary variable indicating whether a node is equipped with satellite antenna. Similarly, let $u_{ij} \in \{0, 1\}$, $\forall \langle i, j \rangle \in \mathcal{E}$ be the binary variable indicating if a link from node i to node j carries node j's TV demands. Using these binary variables, a binary programming problem can be formulated as follows:

$$\underset{\{X_i, u_{ij}\}}{\text{Minimize}} \sum_{i \in \mathcal{V}} X_i \quad (2.1)$$

$$\text{Subject to:} \sum_{j: (i,j) \in \mathcal{E}} u_{ij} \leq pX_i, \forall i \in \mathcal{V}; \quad (2.2)$$

$$\sum_{i: (i,j) \in \mathcal{E}} u_{ij} = (1 - X_j), \forall j \in \mathcal{V}; \quad (2.3)$$

$$\sum_{i: (i,j) \in \mathcal{E}} u_{ij} C_{ij} \geq \delta_j (1 - X_j), \forall j \in \mathcal{V}. \quad (2.4)$$

The objective (2.1) is to minimize the number of satellite antennas. Constraint (2.2) dictates that if node i is selected as a source node ($X_i$=1), the number of its receivers is bounded by the degree of connectivity $\rho$; otherwise ($X_i$=0), node i cannot have any outgoing video traffic. Constraint (2.3) reflects the fact that a non-source node downloads video content from exactly one incoming link, and a source node does not have any incoming video traffic. Constraint (2.4) states that, at a non-source household, the aggregate bandwidth of all incoming links must be greater than its total TV demand.

Figure 2:
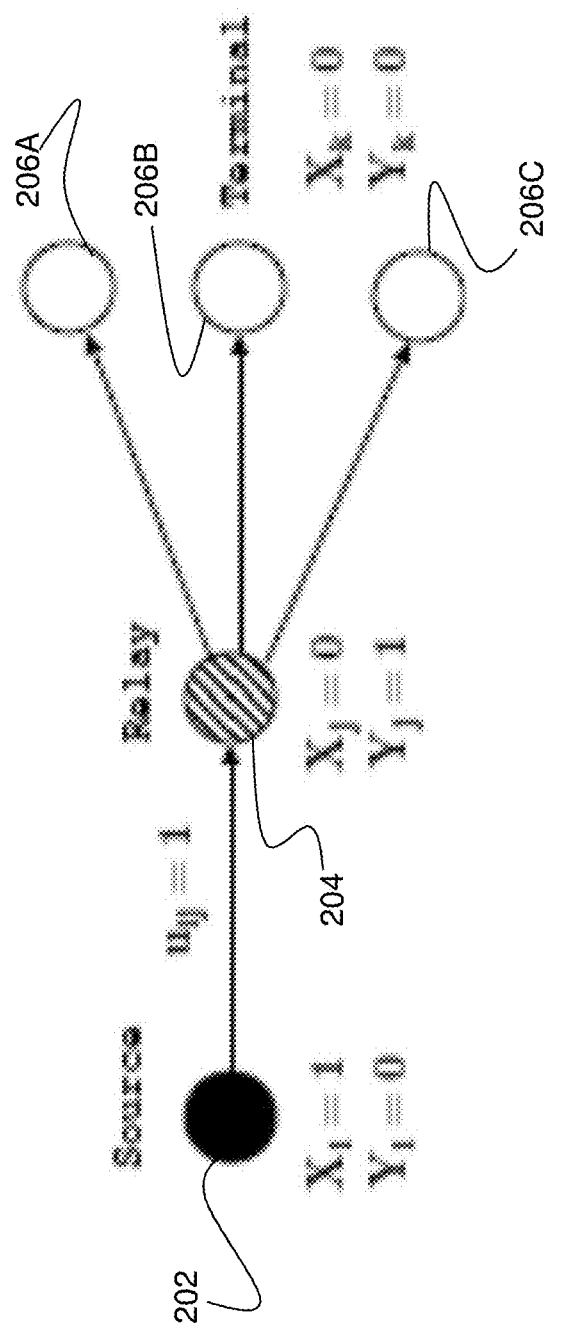
FIG. 2 depicts an illustrative embodiment of two-hop relay routing (wherein node i is a source node ($X_i$=1), node j is a relay ($Y_j$=1), downloading traffic from i ($u_{ij}$=1), relaying video to other terminal nodes ($X_k$=$Y_k$=0))

Referring now in particular to the Two-hop and Non-splittable Relay Routing scenario, for this scenario the maximum relay hop count is relaxed to two. Thus, some non-source households may relay video traffic for other non-source households. In this embodiment, there are three types of households in the network: source nodes with satellite antennas, non-source nodes relaying video for other nodes (called relay nodes), and non-source nodes without any relaying traffic (called terminal nodes). Using $X_i$, introduced in the previous formulation, all non-source nodes have $X_i$=0. Further, now introduced is another binary variable $Y_i \in \{0, 1\}$, $i \in \mathcal{V}$ to indicate whether a node relays other nodes' traffic. Then, for a relay node $X_i$=0 and $Y_i$=1, and for a terminal node, $X_i$=0 and $Y_i$=0. FIG. 2 illustrates the three types of nodes in the two-hop relay embodiment, and how terminal nodes download video content from the source through a common relay node (see configuration 200 showing source node 202, relay node 204 and terminal nodes 206A, 206B and 206C). The joint optimization problem with two-hop relay can be formulated as a new binary programming problem:

$$\underset{\{X_i, Y_i, u_{ij}\}}{\text{Minimize}} \sum_{i \in \mathcal{V}} X_i \quad (2.5)$$

Subject to:

$$\sum_{j:(i,j)\in\mathcal{E}} u_{ij} \leq \rho(X_i + Y_i), \forall\, i \in \mathcal{V}; \quad (2.6)$$

$$\sum_{i:(i,j)\in\mathcal{E}} u_{ij} = (1 - X_j), \forall\, j \in \mathcal{V}; \quad (2.7)$$

$$0 \leq X_i + Y_i \leq 1, \forall\, i \in \mathcal{V}; \quad (2.8)$$

$$Y_j \leq 2 - Y_i - u_{ij}, \forall\, i, j \in \mathcal{V}; \quad (2.9)$$

$$u_{ij} C_{ij} \geq \delta_j u_{ij} + \sum_{k: k \neq i, j} \delta_k u_{jk} - \Theta(1 - X_i - Y_i), \forall\, \langle i, j \rangle \in \mathcal{E}. \quad (2.10)$$

Constraint (2.6) bounds the maximum degree of connectivity at source and relay nodes (both have $X_i+Y_i=1$), and terminal nodes cannot have outgoing video traffic ($X_i+Y_i=0$). According to constraint (2.7), all non-source nodes download their video from exactly one incoming link. Constraint (2.8) states that a node in the distribution network can only assume one role out of source, relay or terminal node. Constraint (2.9) enforces that a relay node does not receive traffic from another relay node. This is because if node j receives video from a relay node i, then $Y_i=1$ and $u_{ij}=1$. Then to make (2.9) hold, the configuration must be that $Y_j=0$, i.e, j cannot be a relay node anymore. On the other hand, if i is a source node, $Y_i=0$, even if $u_{ij}=1$, the configuration can still have $Y_j=1$ (i.e., j can still relay video to other nodes). The last constraint guarantees each outgoing wireless link from a source or relay has enough bandwidth to carry video traffic assigned to it. The first term on the righthand side is the video traffic from the source/relay node to its direct receiver. The second term is non-zero only if i is a source and j is a relay; it represents the traffic of all households downloading video from i through relay j. The last term is zero if i is a source or relay, and if i is a terminal node, $\Theta$ is a large number so that the inequality automatically holds.

Figure 3:
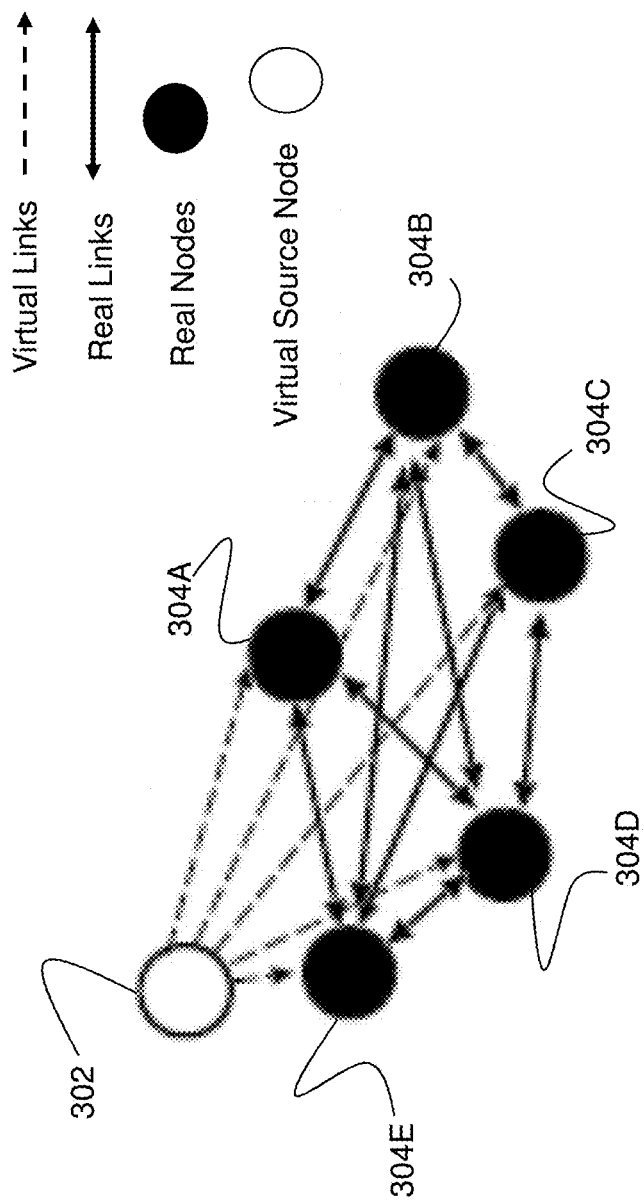
FIG. 3 depicts an illustrative embodiment of a virtual network topology for splittable relay routing.

Referring now in particular to the Splittable Relay Routing With Average Hop-count Limit scenario, it is noted that in the last two optimization formulations, considered were all-or-nothing flows and each household downloads all its video demands from one source/relay through one wireless link. To further improve the flexibility and efficiency of relay routing, a household can receive video from multiple sources and/or relays simultaneously through multiple relay paths. Presented herein is a variation of the conventional multi-commodity flow problem to cover this case. As illustrated in FIG. 3 (showing configuration 300 having virtual source node 302, real nodes 304A-304E, real links (see the solid lined arrows) and virtual links (see the dashed lined arrows)), the distribution network is augmented with a virtual source node (indicated by s), that connects to all the nodes in the topology through virtual links with very high capacities. All video demands are served from the virtual source. If a household installs a satellite antenna, it is equivalent to saying that its virtual link has been activated from the virtual source for direct video downloading. The objective of minimizing the number of satellite dishes is equivalent to minimizing the number of activated virtual links. Defined is a binary variable $l_{si}$ indicating whether the virtual link from the virtual source s to node i is activated. Further defined is $f_{ij}$ as the video traffic volume on link $\langle i, j\rangle$. The optimization with splittable relay routing can be formulated as the following mixed-integer programming problem.

$$\underset{\{l_{xi}\},\{f_{ij}\}}{\text{Minimize}} \sum_{i \in \mathcal{V}} l_{si} \quad (2.11)$$

Subject to:

$$f_{si} + \sum_{j:(i,j)\in\mathcal{E}} f_{ji} = \delta_i + \sum_{k:(i,k)\in\mathcal{E}} f_{ik}, \forall\, i \in \mathcal{V}; \quad (2.12)$$

$$\sum_{i \in \mathcal{V}} f_{si} = \sum_{i \in \mathcal{V}} \delta_i; \quad (2.13)$$

$$f_{ij} \leq C_{ij}, \forall\, \langle i, j \rangle \in \mathcal{E}; \quad (2.14)$$

$$f_{si} \leq l_{si} C_{si}, \forall\, i \in \mathcal{V}; \quad (2.15)$$

$$\sum_{\langle i,j\rangle \in \mathcal{E}} f_{ij} \leq h \sum_{i \in \mathcal{V}} \delta_i, \forall\, i \in \mathcal{V}. \quad (2.16)$$

Constraint (2.12) is the flow-conservation law at node i, i.e., the total incoming traffic at node i (left-hand side) equals the sum of the demand of node i and the total outgoing traffic (right-hand side). (2.13) implies that all the video downloading traffic in the virtual graph originates from the virtual source. (2.14) guarantees traffic on each relay link is bounded by its capacity, and (2.15) makes sure that a virtual link can carry video traffic only if it is activated. Finally, the left-hand side of (2.16) is the total video traffic on all relay links, i.e., the sum of the traffic generated by all households on all links. For each household, the total traffic it generates on all links equals its total video demand multiplied by its average relay hop count. (2.16) effectively limits the average relay hop count of all households to a constant h.

Reference will now be made to a specific example of Fixed Demand With WiFi And LTE. As discussed above, an LTE Base Station (BS) can be a potential injection point of TV content (e.g., live TV content). The formulations discussed above are now extended with respect to LTE Base Stations.

Referring now in particular to the one-hop and non-splittable relay scenario, as modeled above, the distribution network is extended from $\mathcal{G}$ to $\mathcal{G}' = (\mathcal{V}', \mathcal{E}')$ by including LTE Base Stations and LTE links from LTE Base Stations to their covered households. The WiFi optimization problem defined in (2.1) to (2.4) can be extended to cover the LTE case. Each LTE BS can be a potential injection point. Here, $X_i$ is defined on $\mathcal{G}$ to $\mathcal{G}'$, $X_i=1$, $\forall i \in \mathcal{L}$, if and only if a satellite antenna is installed on LTE BS i. Then the optimization objective is to minimize the number of satellite antennas among LTE BSs and households, i.e., $\sum_{i \in \mathcal{V}'} X_i$. Constraints for households defined in (2.2), (2.3) and (2.4) still hold. Introduced now are additional constraints for LTE BS:

$$\sum_{j \in \mathcal{V}} \lambda_{ij} \leq X_i \tau_i, \forall\, i \in \mathcal{L}; \quad (2.17)$$

$$\lambda_{ij} C_{ij} \geq \delta_j u_{ij}, \forall\, i \in \mathcal{L}, \forall\, i \in \mathcal{V}. \quad (2.18)$$

The constraint in (2.17) states that if BS i does not have a satellite antenna, households cannot download video from it; if it does, then the total time shares of all covered household is bounded by available resources at the LTE BS. (2.18) implies that the allocated bandwidth from BS i to household j is greater than the demand of j.

Referring now in particular the two-hop and non-splittable relay scenario, in two-hop relay, LTE BSs can only be potential sources. The optimization problem defined in (2.5) through (2.10) can be extended by updating the objective function to min $\sum_{i \in \mathcal{V}} X_i$, and adding constraints (2.17) and a new LTE capacity constraint updated for two-hop relay:

$$\lambda_{ij} C_{ij} \geq \delta_j u_{ij} + \sum_{k, k \neq i, j} \delta_k u_{jk} - \Theta(1 - X_i), \forall i \in \mathcal{L}, \forall j, k \in \mathcal{V}.$$

Similar to (2.10), this constraint ensures that the link from BS i to household j carries video demands of household j and all other households using j as a relay.

Referring now in particular the Splittable Relay Routing scenario, the inclusion of an LTE BS to the splittable relay routing formulation defined in (2.11) through (2.16) is performed by extending the objective function and all constraints to work on nodes and links in $\mathcal{G} = (\mathcal{V}, \mathcal{E})$. The only change is that for a LTE link, the link capacity constraint (2.14) becomes:

$$f_{ij} \leq \lambda_{ij} C_{ij}, \forall i \in \mathcal{L}, j \in \mathcal{V},$$

reflecting that an LTE link is only active for a fraction of time.

Reference will now be made to a specific example of Time Varying Demand. So far, the formulations assume user TV demands $\{\delta_i, i \in \mathcal{V}\}$ are fixed. In reality, user demands naturally vary over time. Let t=1, . . . , T be the typical time periods, and $\{\delta_i(t), i \in \mathcal{V}\}$ be the user demands at time period t. One approach is to design the distribution network to handle each user's maximum demand over all time periods, that is to let $\delta_i^o \triangleq \max_{t=1,\ldots,T} \delta_i(t)$ and plug in the time-independent demands $\{\delta_i^o, i \in \mathcal{V}\}$ the static formulations in the previous sections to obtain static provisioning and relay routing solutions. This over-provisioning might waste too much resources. Presented here are different ways to cope with time-varying user demands. Specifically, considered are the following cases: 1) dynamic provisioning of satellite antennas and dynamic relay routing; 2) static provisioning of satellite antennas and dynamic relay routing, and 3) static provisioning of satellite antennas and static relay routing. Satellite antenna installation cannot be easily adjusted on an hourly or daily basis. The first solution is not particularly practical. However, it gives the lower bound on the required number of satellite antennas to meet time varying user demands. The third solution may require more satellite antennas than the previous two. However, it is simpler to implement in practice. The second solution is practical and economical, since WiFi/LTE links and relay routing can be conveniently reconfigured using Software Defined Radio and/or Software Defined Networks.

Referring now in particular to the Dynamic Provisioning Of Satellite Antennas And Dynamic Relay Routing scenario, it is noted that in a dynamic formulation, all the design variables $\{X_i, Y_i, u_{ij}, f_{ij}, l_{si}, \lambda_{ij}\}$ in the static formulations should be converted to $\{X_i(t), Y_i(t), u_{ij}(t), f_{ij}(t), l_{si}(t), \lambda_{ij}(t)\}$. Other than the time-dependent demands $\{\delta_i(t), i \in \mathcal{V}\}$, introduced is another binary variable $\Delta_i(t)$ such that if household i has TV traffic demand at time t, then $\Delta_i(t)=1$ otherwise 0.

The one-hop and non-splittable relay routing problem defined in (2.1) through (2.4) can be formulated for each time period t as:

$$\text{Minimize}_{\{X_i(t), u_{ij}(t)\}} \sum_{i \in \mathcal{V}} X_i(t) \tag{2.19}$$

$$\text{Subject to: } \sum_{j:(i,j) \in \mathcal{E}} u_{ij}(t) \leq p X_i(t), \forall i \in \mathcal{V}; \tag{2.20}$$

$$\sum_{i:(i,j) \in \mathcal{E}} u_{ij}(t) = (1 - X_j(t)) \Delta_j(t), \forall j \in \mathcal{V}; \tag{2.21}$$

$$\sum_{i:(i,j) \in \mathcal{E}} u_{ij}(t) C_{ij} \geq \delta_j(t)(1 - X_j(t)), \forall j \in \mathcal{V}. \tag{2.22}$$

Constraint (2.21) indicates that if a household has no demand at time t, then it does not need incoming video traffic. For the two-hop and non-splittable relay routing problem defined in (2.5) through (2.10), all design variables and demands can be changed to be time-dependent, and (2.7) can be updated as:

$$\sum_{i:(i,j) \in \mathcal{E}} u_{ij}(t) = Y_j(t) + \Delta_j(t)(1 - X_j(t) - Y_j(t)), \forall j \in \mathcal{V},$$

which says that node j needs to download video through exactly one incoming link if either j is a relay node ($Y_j(t)=1$), or it is a terminal node ($X_j(t)=Y_j(t)=0$) and has demand ($\Delta_j(t)=1$). For the splittable relay routing problem defined in (2.11) through (2.16), it is sufficient to directly replace $\{f_{ij}, l_{si}, \delta_i\}$ with time-dependent variables/constants $\{f_{ij}(t), l_{si}(t), \delta_i(t)\}$. Similar modifications can be made for formulations with LTE discussed above.

Referring now in particular to the Static Provisioning Of Satellite Antennas And Dynamic Relay Routing scenario, in this case, variables reflecting the positions of satellite antennas $\{X_i, l_{si}\}$ are time independent, while the other variables are time-dependent, i.e., $\{Y_i(t), u_{ij}(t), f_{ij}(t), \lambda_{ij}(t)\}$. The dynamic formulations in the previous section can be converted into the corresponding semi-dynamic formulation. For example, for the one-hop and non-splittable relay routing problem defined in (2.19) through (2.22), the semi-dynamic (that is, static satellite antenna provisioning and dynamic relay routing) version can be:

$$\text{Minimize}_{\{X_i, u_{ij}(t)\}} \sum_{i \in \mathcal{V}} X_i,$$

$$\text{Subject to: } \sum_{j:(i,j) \in \mathcal{E}} u_{ij}(t) \leq \rho X_i, \forall i \in \mathcal{V}, t = 1, \cdots, T;$$

$$\sum_{i:(i,j) \in \mathcal{E}} u_{ij}(t) = (1 - X_j) \Delta_j(t), \forall j \in \mathcal{V}, t = 1, \cdots, T;$$

$$\sum_{i:(i,j) \in \mathcal{E}} u_{ij}(t) C_{ij} \geq \delta_t(t)(1 - X_j), \forall j \in \mathcal{V}, t = 1, \cdots, T.$$

Similar modifications can be made for all other formulations discussed above.

Referring now in particular to the Static Provisioning Of Satellite Antennas And Static Relay Routing scenario, in this this scenario, all design variables are time independent, only the demand constants $\{\delta_i(t), \Delta_i(t)\}$ are time dependent. All the formulations in the dynamic case can be modified accordingly. For example, the one-hop and nonsplittable relay case become:

$$\text{Minimize} \sum_{\{X_i, u_{ij}\}} X_i$$

$$\text{Subject to:} \sum_{j:(i,j)\in\mathcal{E}} u_{ij} \leq \rho X_i, \forall i \in \mathcal{V}, t = 1, \cdots, T;$$

$$\sum_{i:(i,j)\in\mathcal{E}} u_{ij} = (1 - X_j), \forall j \in \mathcal{V}, t = 1, \cdots, T;$$

$$\sum_{i:(i,j)\in\mathcal{E}} u_{ij} C_{ij} \geq \delta_t(t)(1 - X_j), \forall j \in \mathcal{V}, t = 1, \cdots, T.$$

Reference will now be made to discussion of example approximation algorithms. As discussed above, different scenarios are modeled either as binary programming or mixed-integer programming problems, which are both NP-hard problems. When the network size is small, one can use various optimization tools, such as CVX in MATLAB, to get the exact optimal provisioning and relay routing solutions. However, when the network size is large, the computation time might become prohibitive. In this section, presented are heuristic approximation algorithms to obtain close-to-optimal solutions for large networks.

Various problem formulations discussed above are similar to the classic set cover problem. An objective presented here is to determine the minimum number of nodes that can cover all other nodes in a given directed graph $\mathcal{G}$ with limited link capacity. Let $\mathcal{A}$ denote the relay matrix, where $\mathcal{A}[i, j]=1$ if and only if there is a wireless relay link from node i to j, and the capacity of link $\langle i, j \rangle$ is larger than $\delta_j$, the total video demand of j. Let Let $\mathcal{B}(i) \triangleq \{j \in \mathcal{V} : \mathcal{A}[i, j]=1\}$ be the set of nodes that can potentially download their TV demands from node i. Then call $\mathcal{B}(i)$ the bin of node i.

The one-hop and non-splittable relay problem formulated above can be approximately solved using the greedy heuristic algorithm defined in Algorithm 1 (shown in Table II, below).

TABLE II

Algorithm 1
Algorithm 1: Greedy algorithm for one-hop non-splittable relay

Input: Relay matrix ($\mathcal{A}$)
Output: Satellite antennas positioning and one-hop relay topology
1: Initialization: $\mathcal{S} \leftarrow \phi$, $\mathcal{T} \leftarrow \phi$, $\mathcal{A}_{tmp} \leftarrow \mathcal{A}$, $\mathcal{A}_{opt} \leftarrow \phi$
2: while $\mathcal{A}_{tmp}$ is not empty do
3:    Calculate the bin of each node based on $\mathcal{A}_{tmp}$, and find node i with the largest bin.
4:    $\mathcal{S} = \mathcal{S} \cup \{i\}$
5:    if $|\mathcal{B}(i)| \leq \rho$ then
6:      $\mathcal{R}(i) = \mathcal{B}(i)$
7:    else
8:      randomly select $\rho$ nodes in B(i) to R(i).
9:    end if
10:   $\mathcal{T} = \mathcal{T} \cup \mathcal{R}(i) - \{i\}$
11:   $\mathcal{A}_{opt} = \mathcal{A}_{opt} \cup \{\langle i, k \rangle, \forall k \in \mathcal{R}(i)\} - \{\langle k, i \rangle, \forall k \in \mathcal{V}\}$
12:   $\mathcal{A}_{tmp} = \mathcal{A} - \{\mathcal{A}(m, n) : m \in \mathcal{V}, n \in \mathcal{S} \cup \mathcal{T}\}$
13: end while TABLE II-continued Algorithm 1
Algorithm 1: Greedy algorithm for one-hop non-splittable relay 14: return relay topology $\mathcal{A}_{opt}$ and source set $\mathcal{S}_{opt} = (\mathcal{V} - \mathcal{S} - \mathcal{T}) \cup \mathcal{S}$ Let $\mathcal{S}$ be the set of chosen source nodes, and $\mathcal{T}$ the set of terminal nodes that receive their TV channels from some source node in $\mathcal{S}$. At each iteration, node i with the largest bin size is selected as a new source node. All nodes in node i's bin are added to the terminal node set $\mathcal{T}$.

If i's bin has more than $\rho$ nodes, then a random selection is made of nodes to be covered by i. All the nodes in i's bin are added to the terminal node set. All links from i to its receivers are added to the relay topology. This problem is different from the traditional set cover problem as each element of a bin has its own bin. Thus, after selecting a node as source, the nodes in its bin are not removed from the network, because they can still act as sources for other nodes in future iterations. As a result, when selecting a new source, it might have been covered by some source node and added to the terminal set in previous iterations. There is a need to remove it from the terminal node set (line 10), and also remove its incoming video link from the relay topology (line 11). After updating the source and terminal node sets, all links going to source and terminal nodes no longer need to be considered, and thus are removed from the relay matrix. After the iterations, those nodes that are not marked as either source or terminal node are isolated nodes that need satellite antennas. Finally, the relay topology and source set are returned Algorithm 1 can be extended to cover the two-hop non-splittable relay case. Similar to the one-hop case, a greedy iterative algorithm is developed. At each iteration, the algorithm adds node i with the largest number of one-hop children as a new source. The links from node i to their children $\mathcal{R}(i)$ are added to the relay topology. Different from the one-hop case, some nodes in $\mathcal{R}(i)$ might further act as relays and forward video to two-hop children of i. Let $\mathcal{D}(i, \mathcal{R}(i))$ be the set of nodes connecting to i through $\mathcal{R}(i)$ i.e., $$\mathcal{D}(i, \mathcal{R}(i)) \triangleq \{k \in \mathcal{V} : \exists j \in \mathcal{R}(i) \text{ such that } C_{jk} \geq \delta_k\}.$$

Note, a node $k \in \mathcal{D}(i, \mathcal{R}(i))$ might connect to i through multiple relay nodes in $\mathcal{R}(i)$, and it can be added as a two-hop child of i through any one of them in the relay topology. To build the two-hop relay tree rooted at i, developed is another greedy iterative algorithm. For simplicity, provided below is an outline of this other algorithm as follows.

1) First build the one-hop relay tree from i to $\mathcal{R}(i)$, and update the spare capacity on link as $\langle i, j \rangle$, $j \in \mathcal{R}(i)$ as $\tilde{C}_{ij} = C_{ij} - \delta_j$.
2) Select the node, say $j_0$, with the highest spare capacity from node i to grow the second hop relay.
3) Among all children of say $j_0$, first select a node k that is connected to i only through say $j_0$, if no such a node exists, randomly select a child k of say $j_0$. If $\tilde{C}_{ij_0} \geq \delta_k$, add k as a two-hop child of i through $j_0$ in the relay topology, and update the spare capacity $\tilde{C}_{ij_0} = \tilde{C}_{ij_0} - \delta_k$. If no child of $j_0$ can be added to the relay topology, set $\tilde{C}_{ij_0} = 0$.
4) Go back to Step 2, unless either the spare capacity of all first-hop links originated from node i become zero, or all nodes in $\mathcal{D}(i, \mathcal{R}(i))$ are added to the relay topology.

After the two-hop relay tree rooted as node i is built, move on to find the next source with the highest degree until all the nodes are covered.

A discussion directed to a performance evaluation of various embodiments will now be presented. In particular, presented here is an evaluation of the WiLiTV architecture using real household topology and user demand data from four communities with different household sparsity served by a major service provider in the USA. Community (i) consists of 22 nodes with households sparsely located. Communities (ii), (iii) and (iv) consist of 21, 13 and 17 households, respectively. The average distance between households in the community (i) is around 75 m, while in the latter three communities it is less than 55 m. The case with the LTE Base Station is considered for community (i) only, and its location and the available LTE resources are taken from the database of Base Stations for that community. Using the optimization formulations discussed above, the optimal source provisioning and relay topologies are determined under different relay routing complexity constraints. Further, discussed are the use of parallel streams supported in IEEE 802.11n. Using beam-forming and Multiple Input, Multiple Output (MIMO) antenna techniques, up to four parallel streams can be supported in IEEE 802.11n.

Figure 4:
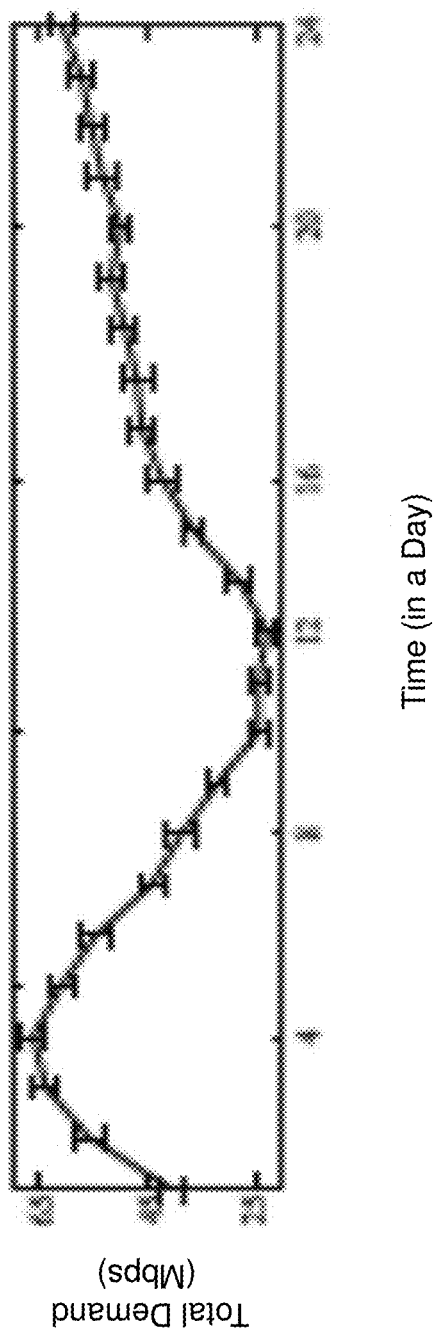
FIG. 4 depicts an example demand pattern in a community according to an embodiment (in this example, the mean total demand per hour (50 samples) in the community is shown (with vertical bars denoting 95% confidence intervals))
Figure 5A:
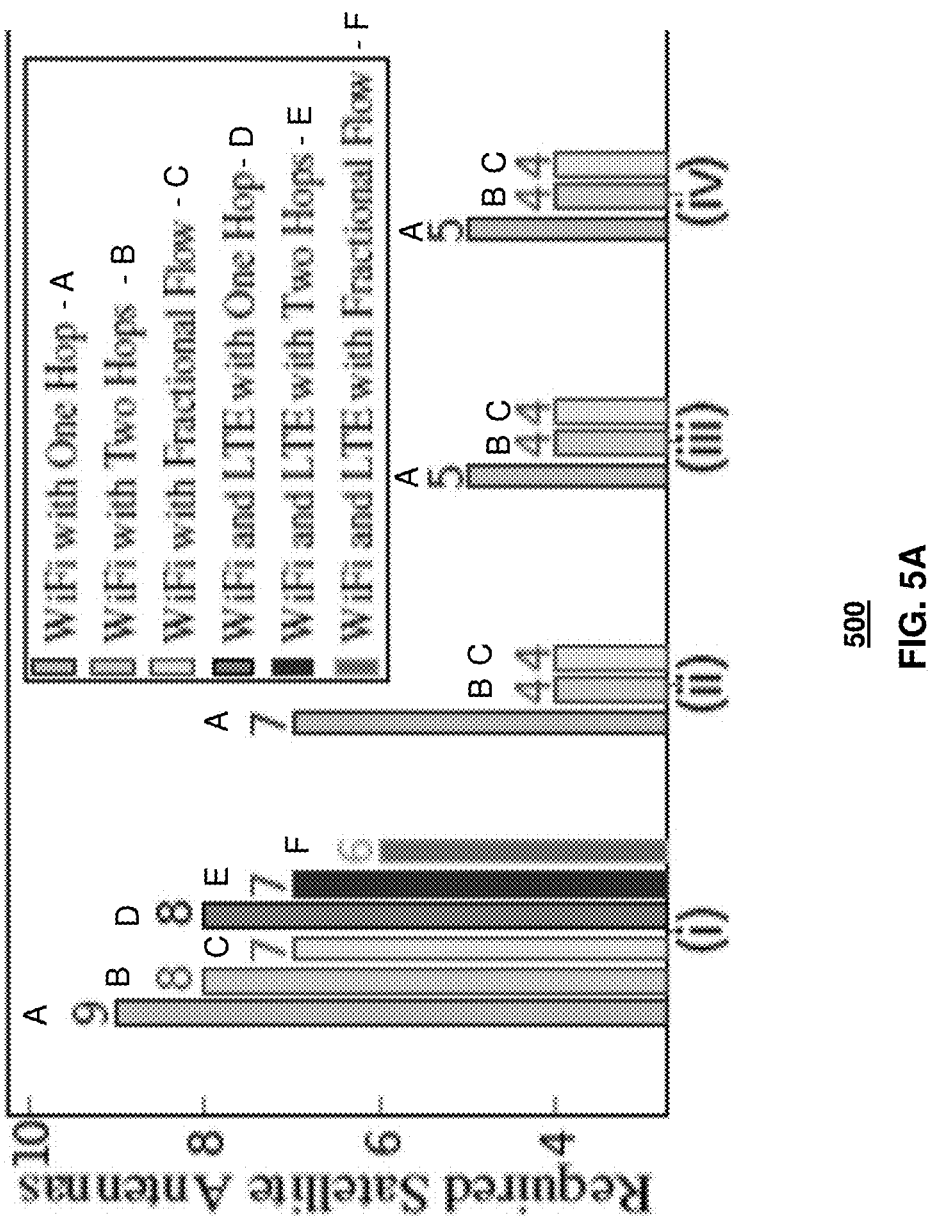
FIGS. 5A-5D depict examples of a required number of satellite antennas in four considered communities to satisfy the maximum (fixed) user TV demands according to an embodiment (in FIG. 5A, the number of streams=1.
Figure 5B:
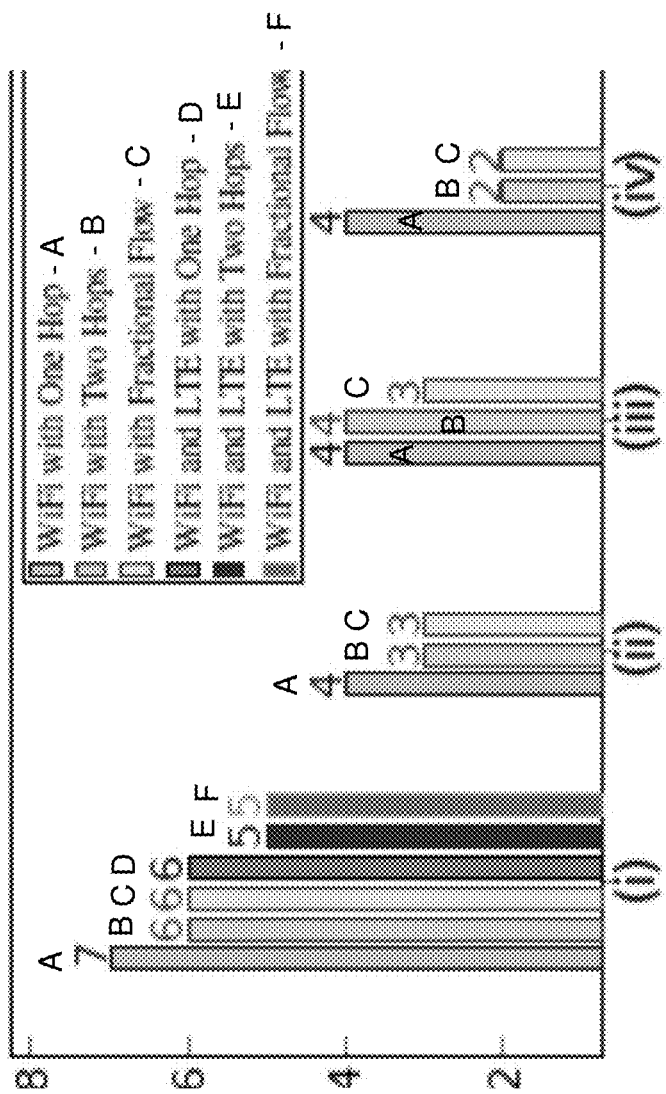
Figure 5C:
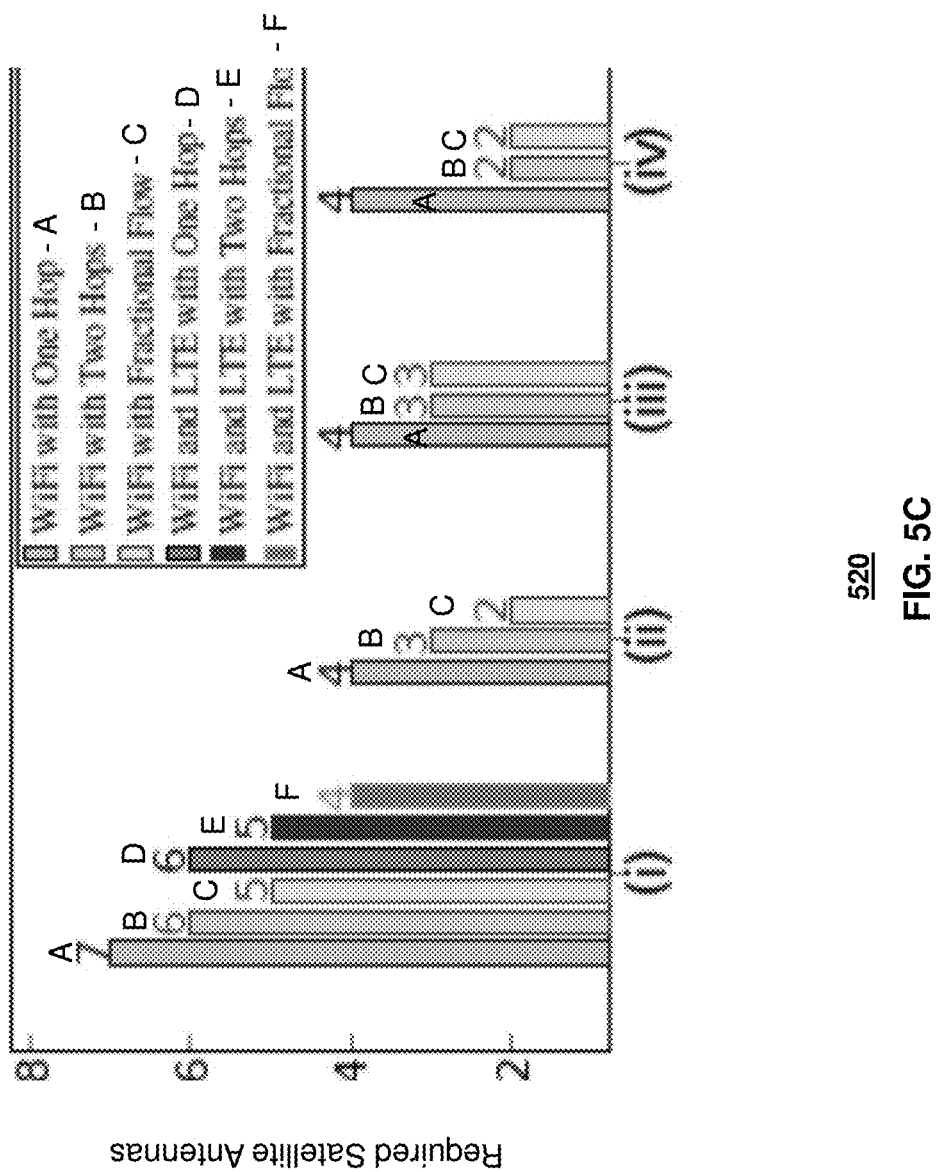
Figure 5D:
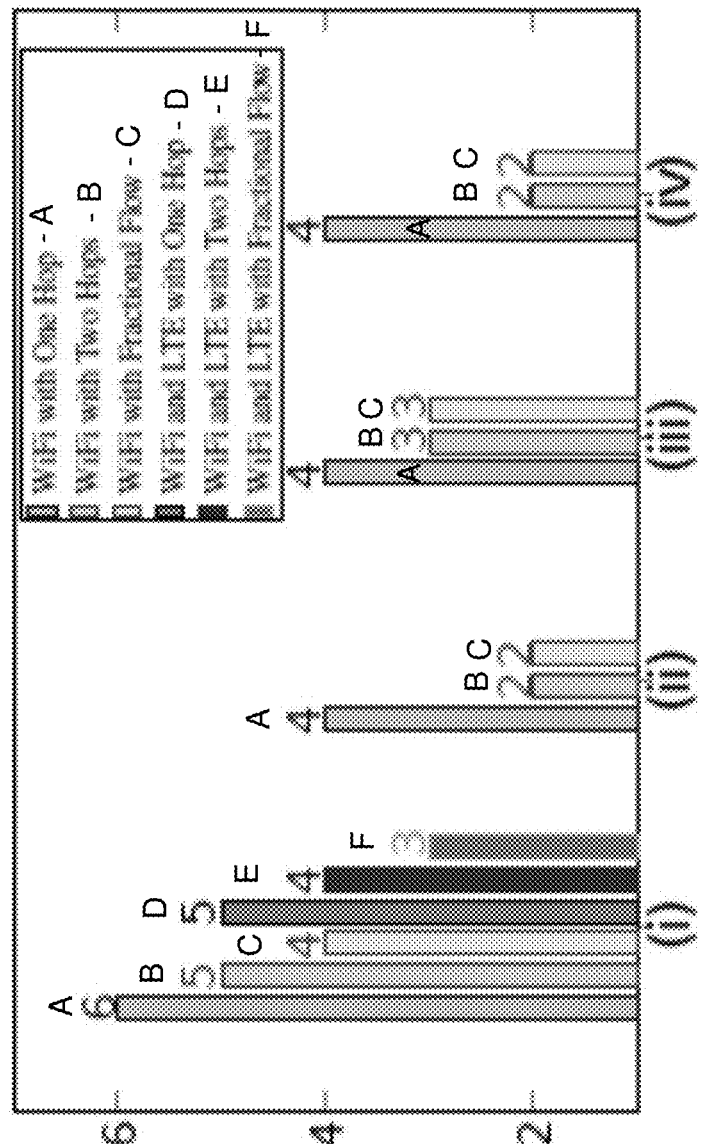

FIG. 4 shows a typical demand pattern over a day. From this real demand data, obtained from a service provider, the probability distributions are computed for the requested number of TV channels for each household at each hour of a day. In each simulation, user demand samples are drawn from these probability distributions. The carrier frequencies for WiFi and LTE are 5 GHz and 2 GHz respectively, the channel bandwidth for both WiFi and LTE are 20 MHz. The degree of connectivity of household is $P=5$. The data rate of each TV channel is 5 Mbps, and the maximum relay hop count is h=2. For these simulation parameters, the heuristic algorithm obtains the identical result with a shorter computation time (particularly in the two-hop scenario, where the exact algorithm takes tens of seconds while the heuristic algorithm takes a few seconds).

Referring now in particular to the Fixed Demand scenario, considered first are source provisioning and relay routing using peak demand per household observed over a long period of time. The fixed peak demand scenario gives an upper bound on the required number of satellite antennas. In FIGS. 5A-5D, presented are the number of nodes (households or LTE BSs) that must be equipped with satellite antennas for live TV content distribution in different scenarios for different communities (in FIG. 5A, the number of streams=1; in FIG. 5B, the number of streams=2; in FIG. 5C, the number of streams=3; in FIG. 5D, the number of streams=4). With one IEEE 802.11n stream and one-hop relay, 50%, 30%, 38% and 29% nodes must be equipped with satellite antennas in the four communities, respectively. Similarly, with four parallel IEEE 802.11n streams and one-hop communication, 36%, 19%, 30% and 23% nodes must be equipped with satellite antennas. When LTE BSs are available, the required number of satellite antennas further decreases. In the best case scenario, with a heterogeneous network consisting of both LTE and WiFi links over a two-hop relay with fractional flow, the required number of satellite antennas are 13% for community (i) for four streams. Similarly for four streams using WiFi links over two hops, the required number of satellite antennas reduces to 9%, 23% and 11% for community (ii), (iii) and (iv) respectively. This suggests that additional WiFi link capacities resulting from more streams directly translate into cost savings on satellite antennas, especially with two-hop relays.

Also notice that, even though fractional flows are more flexible than all-or-nothing flows, in the evaluated scenarios, they bring no or marginal performance gains over the corresponding all-or-nothing flows. This suggests that non-splittable relay routing may achieve most of the cost savings in practice, without incurring the complexity and reliability concerns of splittable relay routing.

Figure 6A:
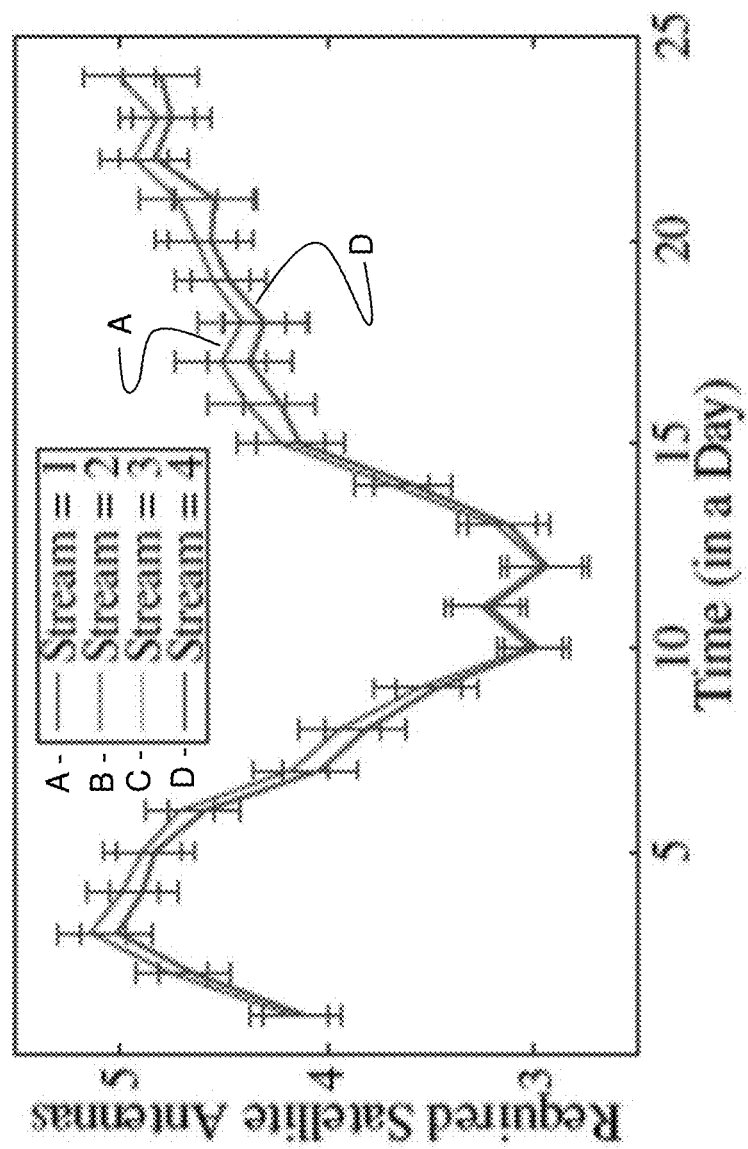
FIGS. 6A-6D depict examples of variation (in Community (i)) of required satellite antennas with non-splittable relay to satisfy demand at each time instant according to an embodiment (FIG. 6A shows WiFi over one hop.
Figure 6B:
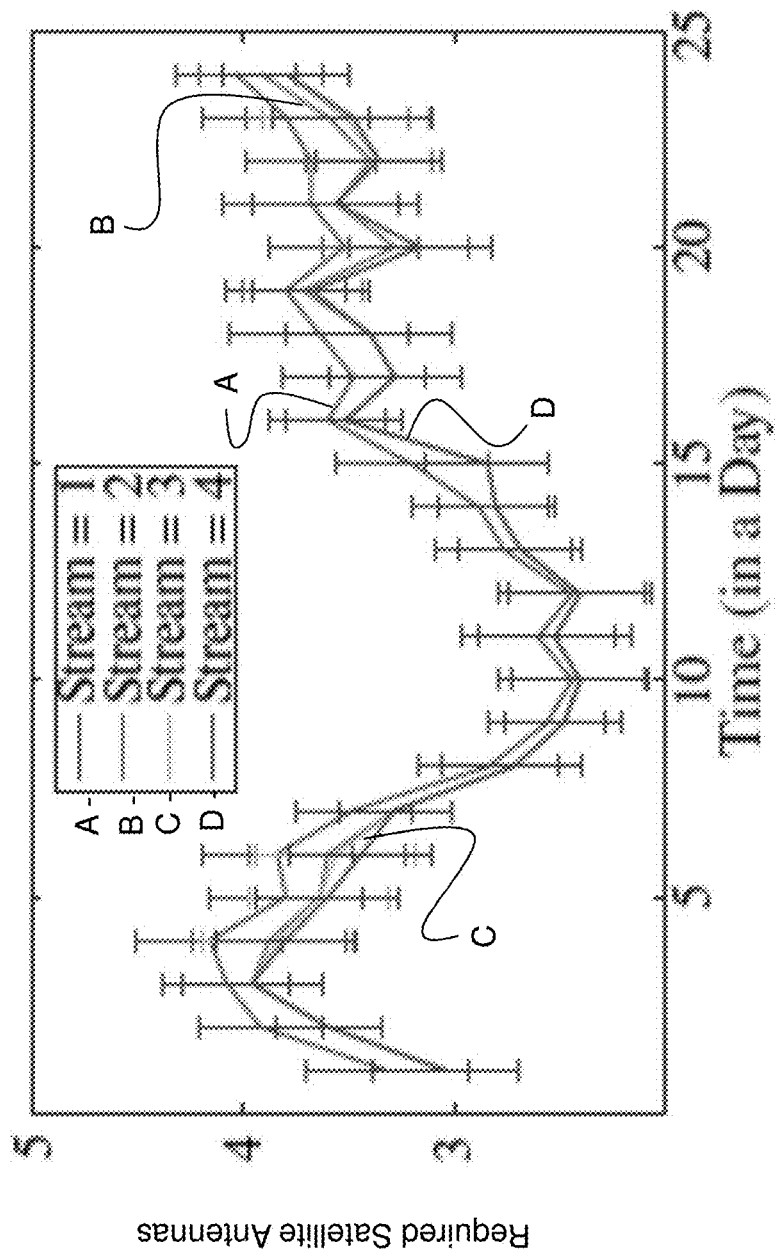
Figure 6C:
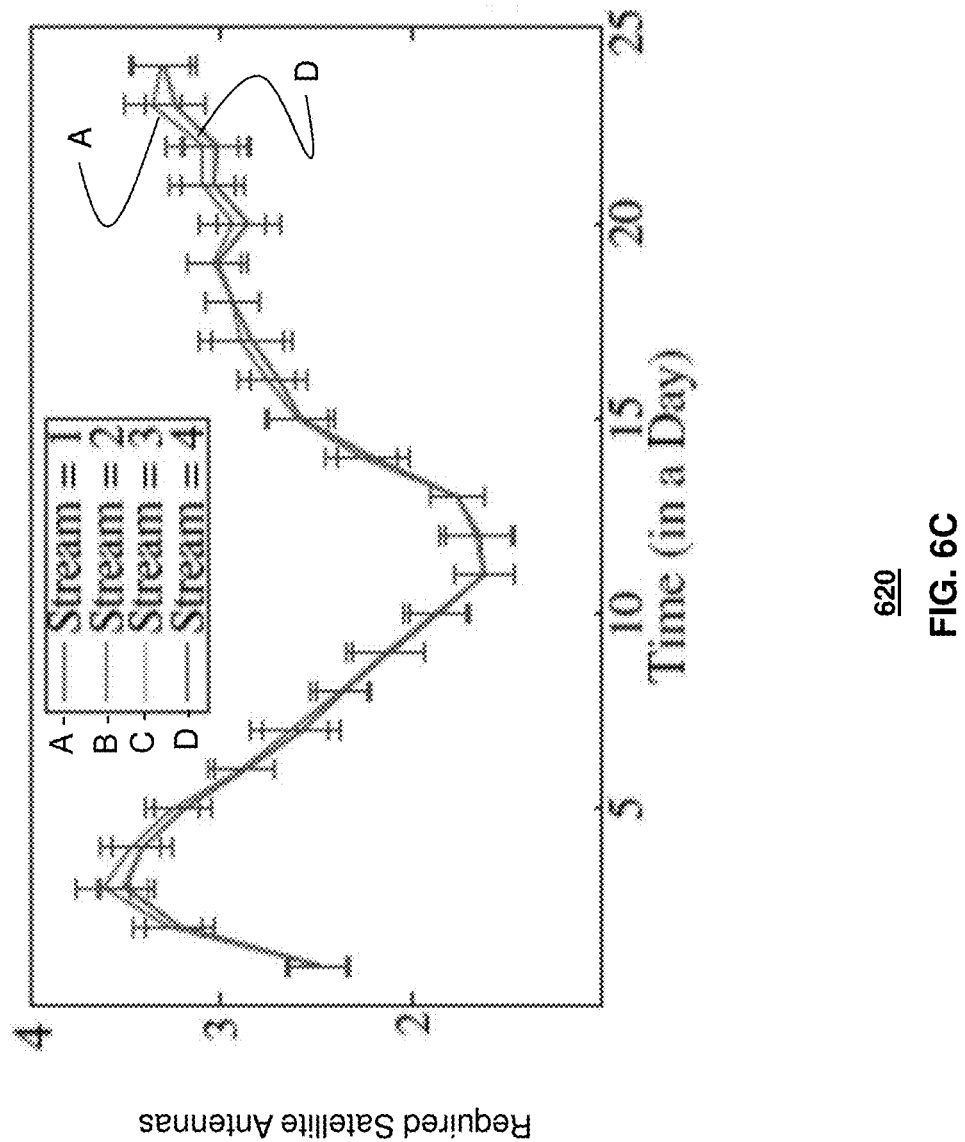
Figure 6D:
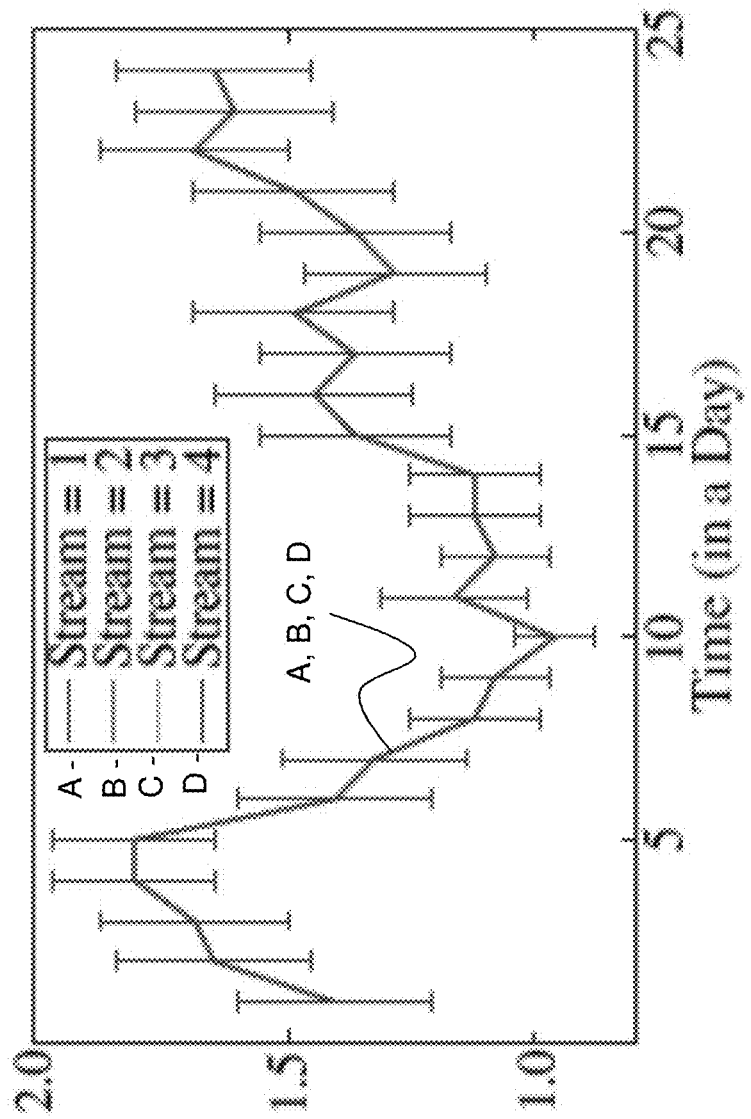

Referring now in particular to the Dynamic Solution For Time-varying Demand scenario, FIGS. 6A-6D plot the required number of satellite antennas for time-varying demand with essentially impractical dynamic antenna provisioning and dynamic relay routing as discussed above (FIG. 6A shows WiFi over one hop; FIG. 6B shows WiFi over two hops; FIG. 6C shows WiFi and LTE over one hop; FIG. 6D shows WiFi and LTE over two hops). Considered is non-splittable relay routing to determine the variation of the required satellite antennas. They serve as the lower bounds for satisfying time-varying demands. The vertical bars in the figures denote the 95% confidence intervals. It can be observed that the result highly depends upon the TV content demand Similar to previous observation for fixed demand, the required numbers of satellite antennas decrease from one-hop relay to two-hop relay. It can also be observed that the confidence intervals with two-hop relays are significantly higher than one-hop relay. This suggests that the additional gain from two-hop relays are more time-dependent. For two-hop WiFi, it can be observed that there is a larger gap between one stream and two streams. This observation can simply be explained from the fact that a higher number of streams is useful to support multi-hop communications. Similar results are obtained for fractional flows with both WiFi and heterogeneous networks.

Figure 7A:
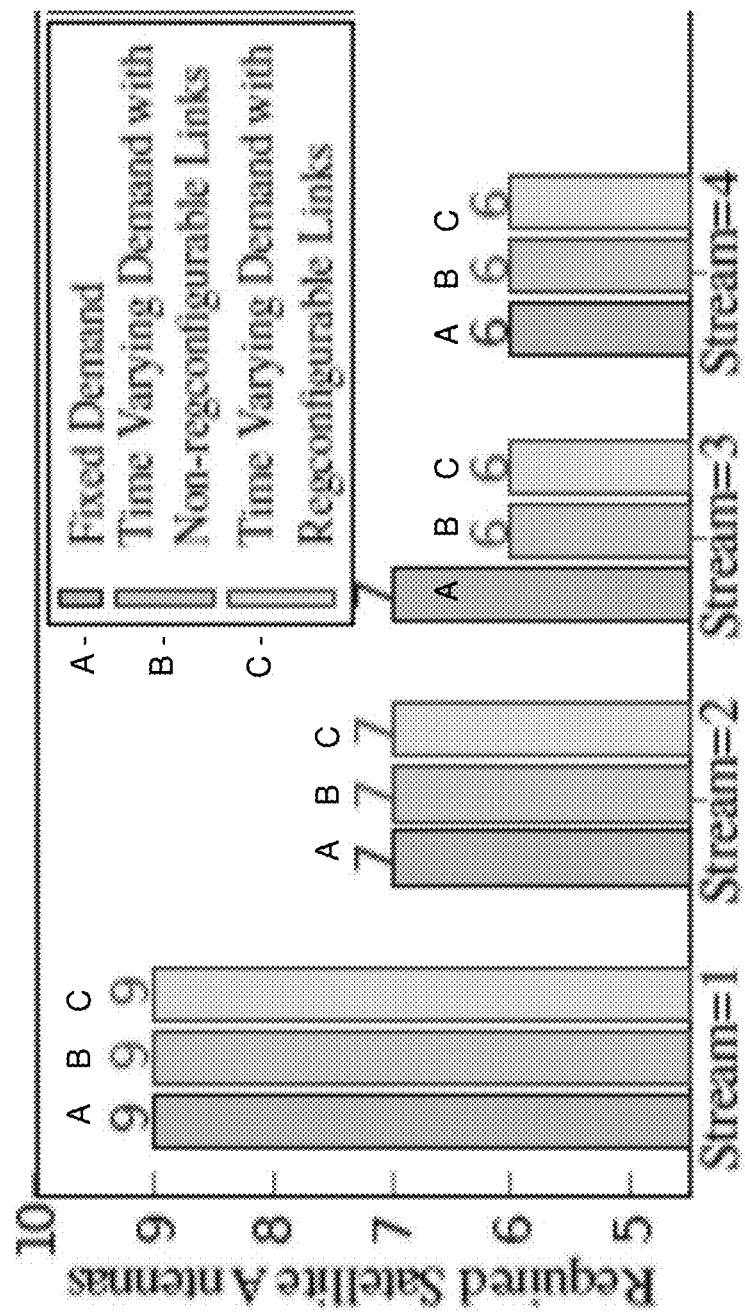
FIGS. 7A-7D depict examples of (in Community (i)) required number of satellite antennas with non-splittable relay to satisfy demands at all time instants according to an embodiment (FIG. 7A shows WiFi over one hop.
Figure 7B:
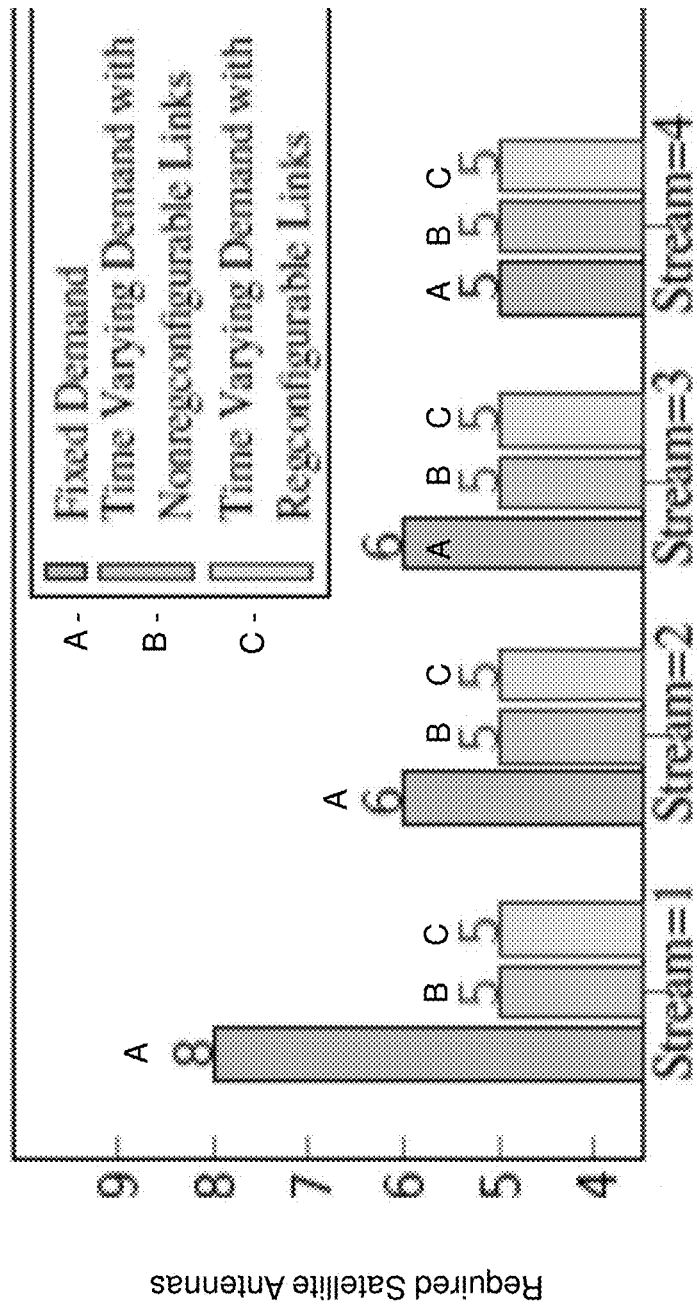
Figure 7C:
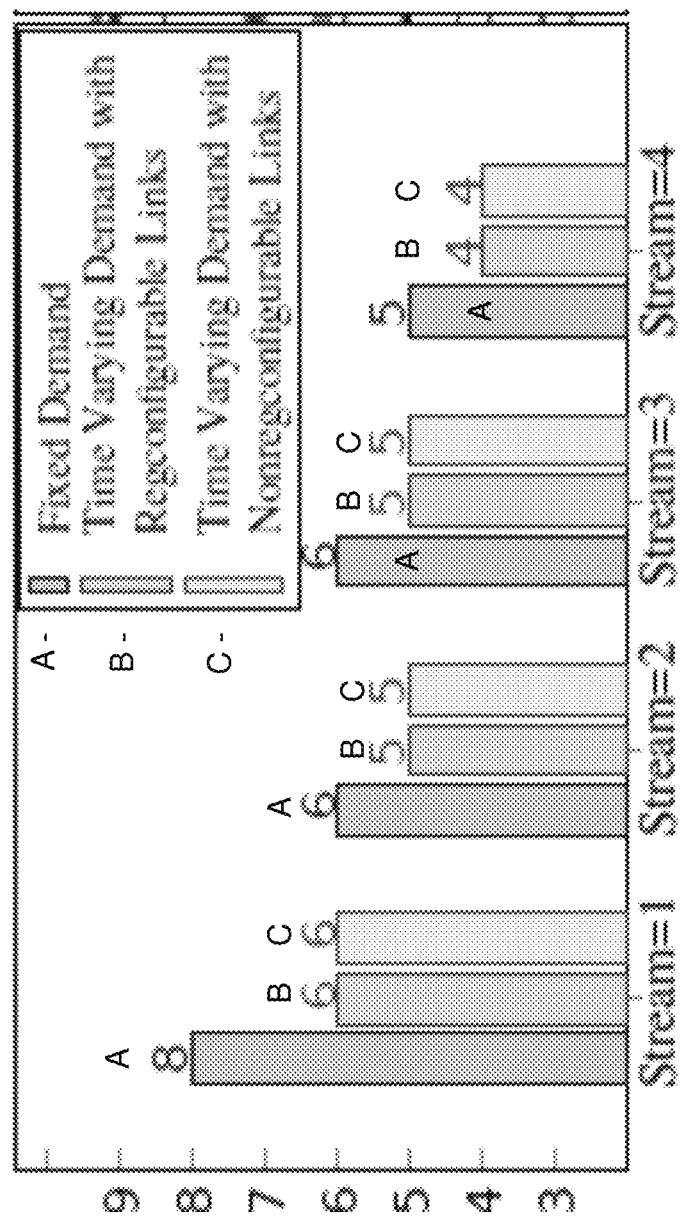
Figure 7D:
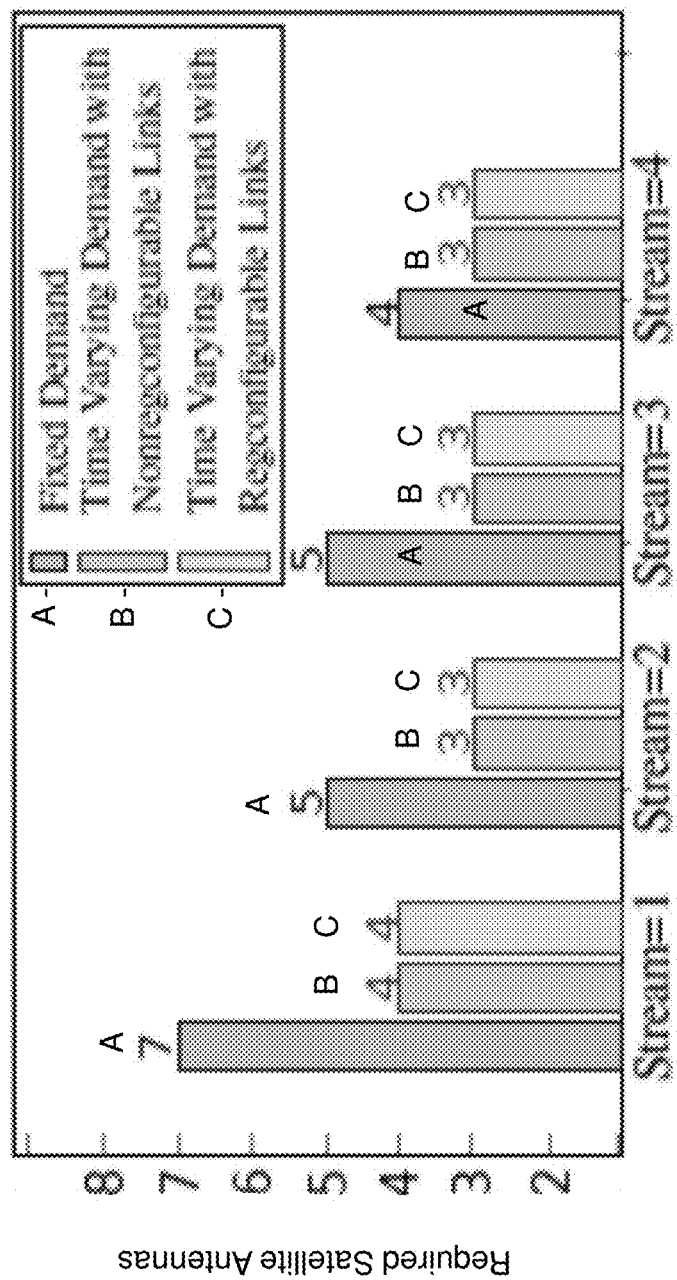

Referring now in particular to the Static Satellite Antenna Provisioning scenario, an optimal distribution topology is obtained here with static satellite antennas having, (i) reconfigurable and, (ii) nonreconfigurable links, as discussed above. FIGS. 7A-7D compare the required numbers of satellite antennas to satisfy time varying demands at all time instants to results obtained for fixed peak TV demands in FIGS. 5A-5D, all with nonsplittable relays (FIG. 7A shows WiFi over one hop; FIG. 7B shows WiFi over two hops; FIG. 7C shows WiFi and LTE over one hop; FIG. 7D shows WiFi and LTE over two hops). The data suggests that formulations considering the time-varying demands, instead of per-user peak demands, can lead to a higher cost saving in two-hop and LTE cases. For the two cases considered with fixed positioning of satellite antennas with configurable and non-reconfigurable relays, obtained were the same results for all the combinations studied. This suggests that fixed positioning of satellite antennas and proper selections of relay routing are sufficient for an optimal distribution topology.

Figure 8A:
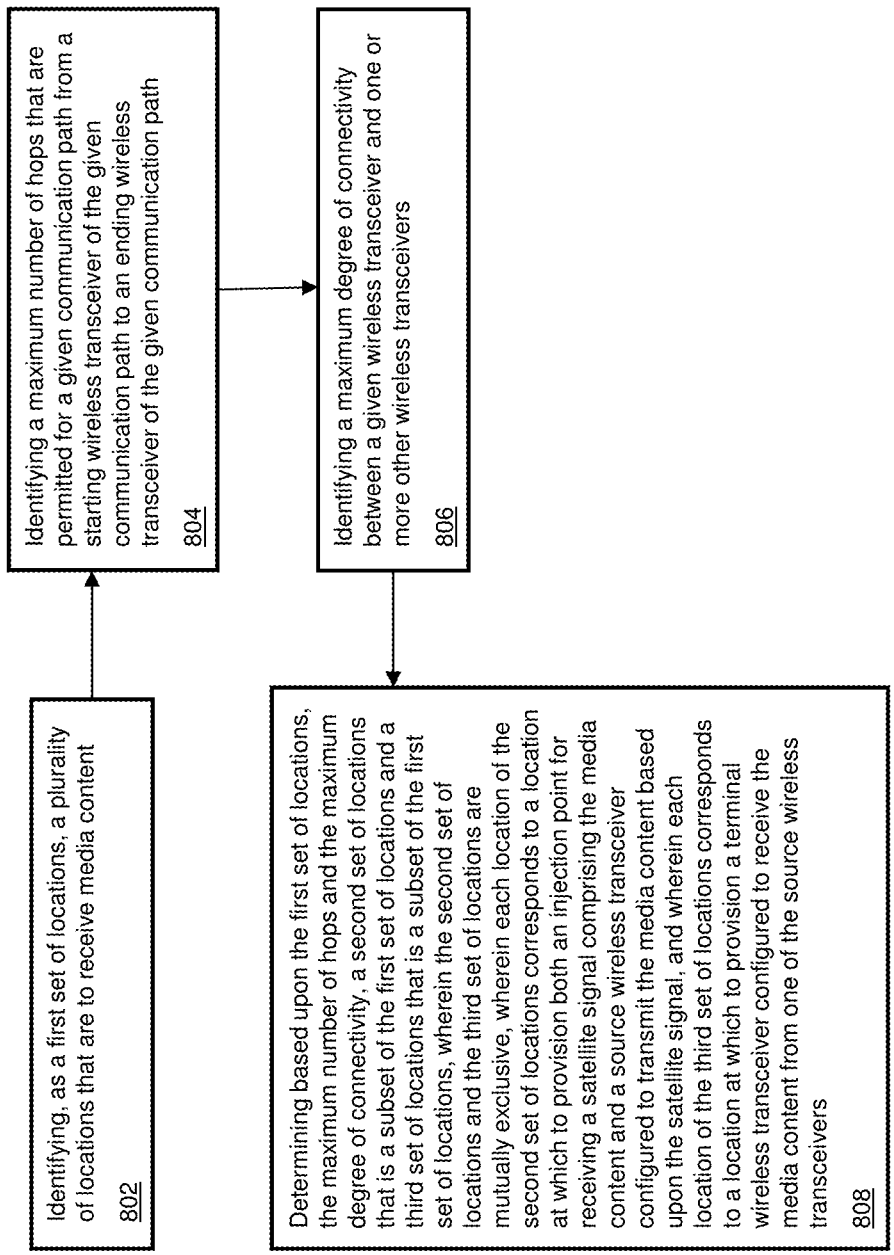
FIG. 8A depicts an illustrative embodiment of a method used in portions of the system described in FIG. 1.

FIG. 8A depicts an illustrative embodiment of a method used by system 150 of FIG. 1. While for purposes of simplicity of explanation, the respective processes are shown and described as a series of blocks in FIG. 8A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 8A, method 800 begins at step 802 with identifying, as a first set of locations, a plurality of locations that are to receive media content. Method 800 then continues to step 804 with identifying a maximum number of hops that are permitted for a given communication path from a starting wireless transceiver of the given communication path to an ending wireless transceiver of the given communication path. Method 800 then continues to step 806 with identifying a maximum degree of connectivity between a given wireless transceiver and one or more other wireless transceivers. Method 800 then continues to step 808 with determining based upon the first set of locations, the maximum number of hops and the maximum degree of connectivity, a second set of locations that is a subset of the first set of locations and a third set of locations that is a subset of the first set of locations, wherein the second set of locations and the third set of locations are mutually exclusive, wherein each location of the second set of locations corresponds to a location at which to provision both an injection point for receiving a satellite signal comprising the media content and a source wireless transceiver configured to transmit the media content based upon the satellite signal, and wherein each location of the third set of locations corresponds to a location at which to provision a terminal wireless transceiver configured to receive the media content from one of the source wireless transceivers.

FIG. 8B depicts an illustrative embodiment of a method used by system 150 of FIG. 1. While for purposes of simplicity of explanation, the respective processes are shown and described as a series of blocks in FIG. 8B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 8B, method 840 begins at step 842 with identifying, by a system comprising a processor, a first set of locations, wherein each location of the first set of locations corresponds to a household that is to receive media content. Method 840 then continues to step 844 with identifying, by the system, a maximum communication range between a pair of wireless transceivers. Method 840 then continues to step 846 with identifying, by the system, a maximum number of hops that are permitted for a given communication route from a starting wireless transceiver of the given communication route to an ending wireless transceiver of the given communication route. Method 840 then continues to step 848 with identifying, by the system, a maximum degree of connectivity between a given wireless transceiver and one or more other wireless transceivers. Method 840 then continues to step 850 with identifying, by the system, an availability of a split data flow, wherein a first portion of the media content is receivable at a particular wireless transceiver at substantially a same time that a second portion of the media content is receivable from another wireless transceiver. Method 840 then continues to step 852 with determining by the system based upon the first set of locations, the maximum communication range, the maximum number of hops, the maximum degree of connectivity and the availability of the split data flow, a second set of locations and a third set of locations, wherein the second set of locations comprises a subset of the first set of locations, wherein each location of the second set of locations corresponds to a location at which to provision both a satellite receiver system and a source wireless transceiver configured to transmit some or all of the media content based upon a signal from the satellite receiver system, wherein the third set of locations comprises a subset of the first set of locations, wherein the third set of locations and the second set of locations are mutually exclusive, and wherein each location of the third set of locations corresponds to a location at which to provision a terminal wireless transceiver configured to receive some or all of the media content from each of one or more of the source wireless transceivers.

Figure 8C:
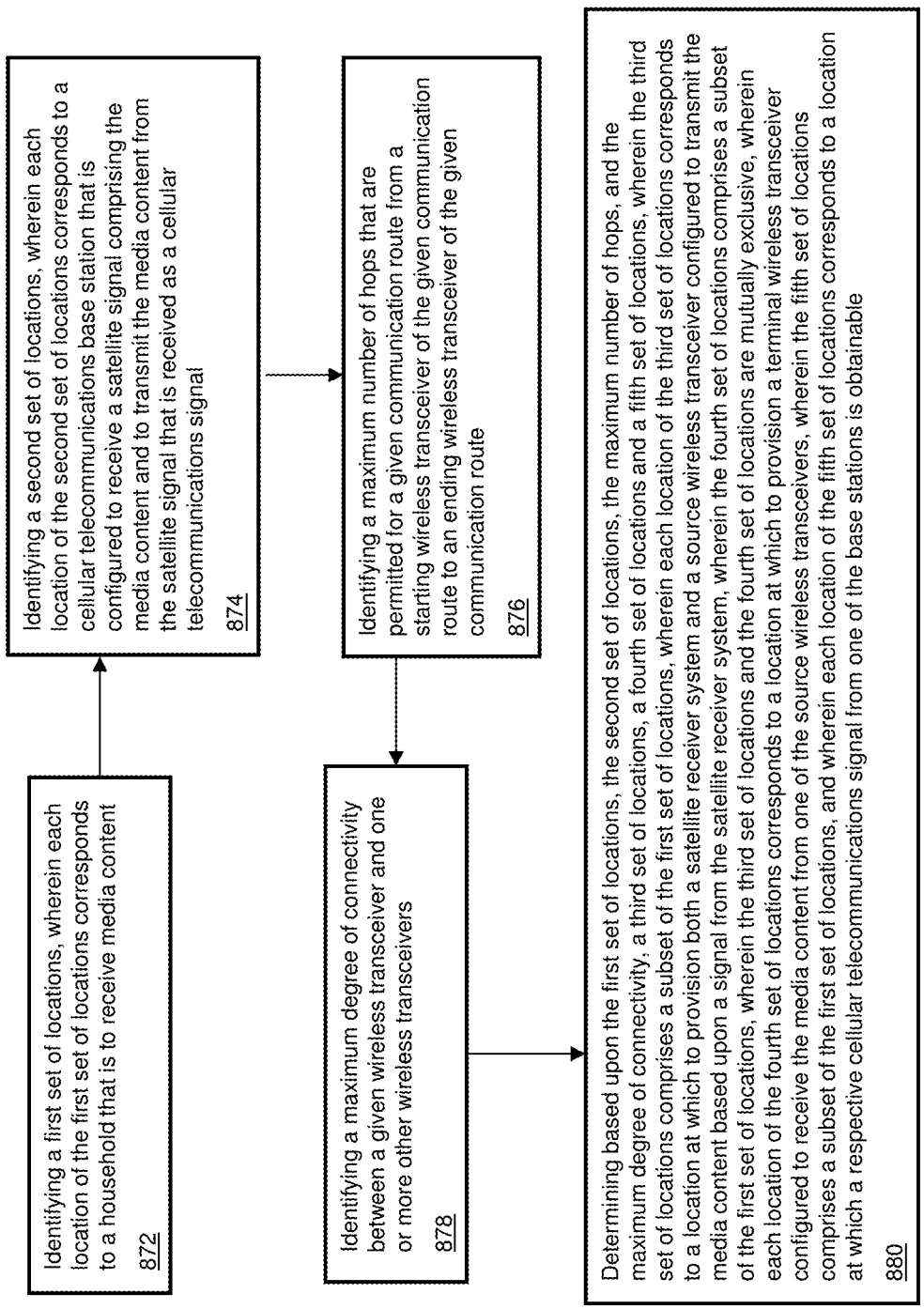
FIG. 8C depicts an illustrative embodiment of a method used in portions of the system described in FIG. 1.

FIG. 8C depicts an illustrative embodiment of a method used by system 150 of FIG. 1 While for purposes of simplicity of explanation, the respective processes are shown and described as a series of blocks in FIG. 8C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 8C, method 870 begins at step 872 with identifying a first set of locations, wherein each location of the first set of locations corresponds to a household that is to receive media content. Method 870 then continues to step 874 with identifying a second set of locations, wherein each location of the second set of locations corresponds to a cellular telecommunications base station that is configured to receive a satellite signal comprising the media content and to transmit the media content from the satellite signal that is received as a cellular telecommunications signal. Method 870 then continues to step 876 with identifying a maximum number of hops that are permitted for a given communication route from a starting wireless transceiver of the given communication route to an ending wireless transceiver of the given communication route. Method 870 then continues to step 878 with identifying a maximum degree of connectivity between a given wireless transceiver and one or more other wireless transceivers. Method 870 then continues to step 880 with determining based upon the first set of locations, the second set of locations, the maximum number of hops, and the maximum degree of connectivity, a third set of locations, a fourth set of locations and a fifth set of locations, wherein the third set of locations comprises a subset of the first set of locations, wherein each location of the third set of locations corresponds to a location at which to provision both a satellite receiver system and a source wireless transceiver configured to transmit the media content based upon a signal from the satellite receiver system, wherein the fourth set of locations comprises a subset of the first set of locations, wherein the third set of locations and the fourth set of locations are mutually exclusive, wherein each location of the fourth set of locations corresponds to a location at which to provision a terminal wireless transceiver configured to receive the media content from one of the source wireless transceivers, wherein the fifth set of locations comprises a subset of the first set of locations, and wherein each location of the fifth set of locations corresponds to a location at which a respective cellular telecommunications signal from one of the base stations is obtainable.

FIG. 9 depicts an illustrative embodiment of a communication system 900 for providing various communication services, such as delivering media content. The communication system 900 can represent an interactive media network, such as an interactive television system (e.g., an Internet Protocol Television (IPTV) media system). Communication system 900 can be overlaid or operably coupled with system 150 of FIG. 1 as another representative embodiment of communication system 900. For instance, one or more devices illustrated in the communication system 900 of FIG. 9 can implement any of methods 800, 840 and/or 870.

In one or more embodiments, the communication system 900 can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol. The VHS 914 can distribute multimedia broadcast content via an access network 918 to commercial and/or residential buildings 902 housing a gateway 904 (such as a residential or commercial gateway).

The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a processing device (herein referred to as processing device 930). The processing device 930 can use computing and communication technology to perform function 962, which can include among other things, the processing techniques described by methods 800, 840 and/or 870. The media processors 906 and wireless communication devices 916 can be provisioned with software functions 964 and 966, respectively, to utilize the services of processing device 930. For instance, functions 964 and 964 of media processors 906 and wireless communication devices 916 can be similar to the functions described for wireless transceivers in accordance with methods 800, 840 and/or 870.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
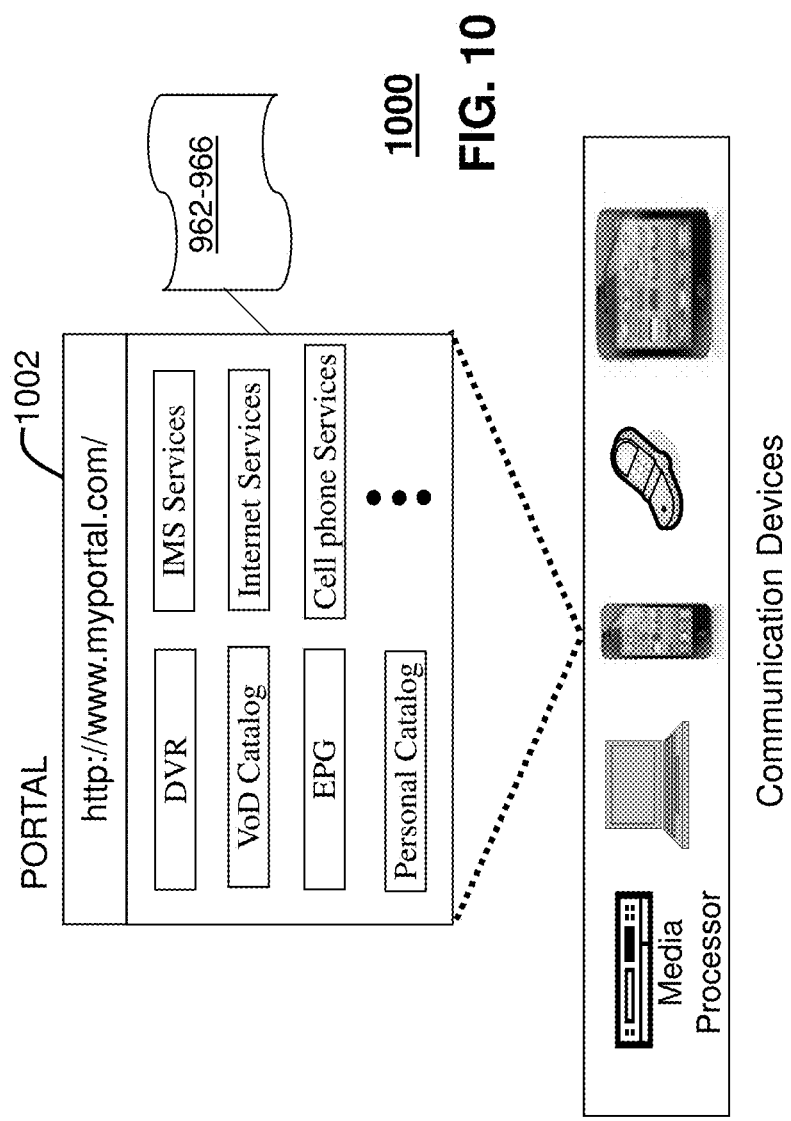
FIG. 10 depicts an illustrative embodiment of a web portal for interacting with the communication systems of, for example, FIGS. 1 and 9.

FIG. 10 depicts an illustrative embodiment of a web portal 1002 of a communication system 1000. Communication system 1000 can be overlaid or operably coupled with system 150 of FIG. 1 and/or communication system 900 as another representative embodiment of system 150 of FIG. 1 and/or communication system 900. The web portal 1002 can be used for managing services of system 150 of FIG. 1 and/or communication system 900. A web page of the web portal 1002 can be accessed by a Uniform Resource Locator (URL) with an Internet browser using an Internet-capable communication device such as those described in FIG. 1 and/or FIG. 9. The web portal 1002 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1002 can also be used for provisioning IMS services described earlier, provisioning Internet services, provisioning cellular phone services, and so on.

The web portal 1002 can further be utilized to manage and provision software applications 962-966, to adapt these applications as may be desired by subscribers and/or service providers of system 150 of FIG. 1 and/or communication system 900. For instance, users of the services provided by server 930 can log into their on-line accounts and provision server 930 with user profiles, provide contact information to server to enable it to communication with devices described in FIGS. 1 and 9, and so on. Service providers can log onto an administrator account to provision, monitor and/or maintain the system 150 of FIG. 1 and/or server 930.

Figure 11:
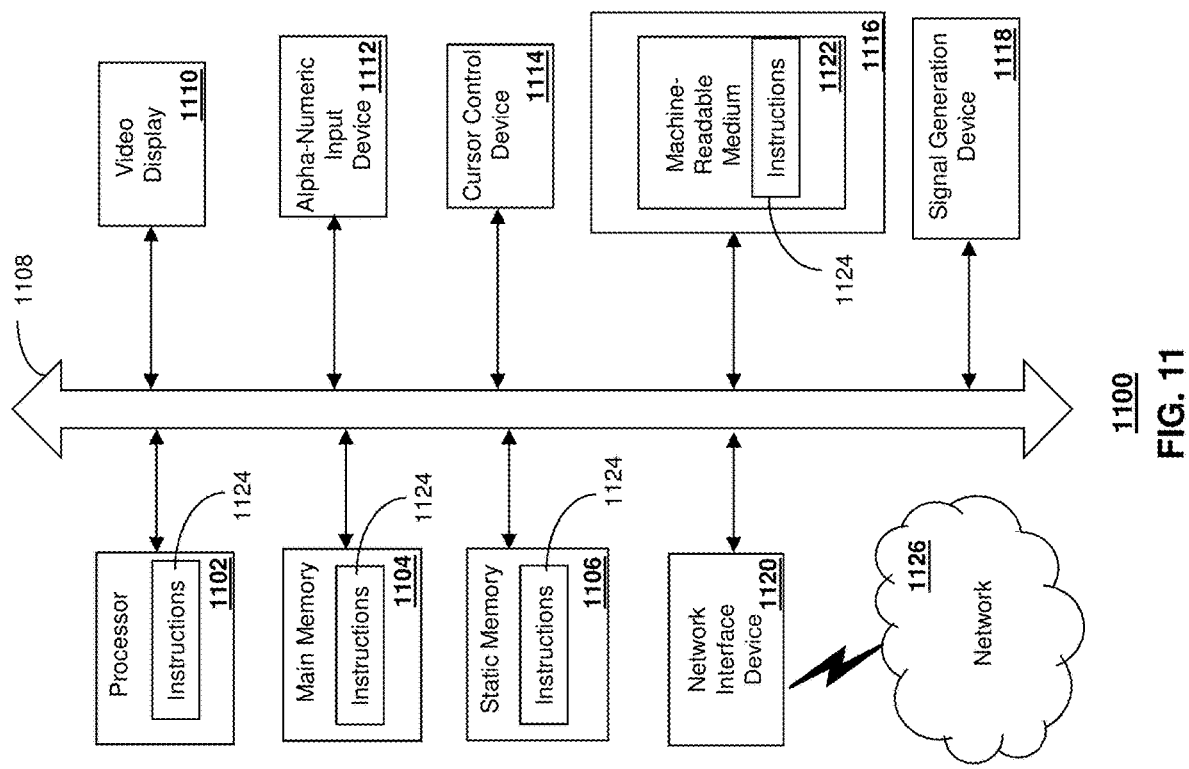
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the processing device 930 and/or other devices of FIGS. 1 and 9. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

One or more of the embodiments can utilize one or more features described in U.S. Provisional Application Ser. No. 62/491,822, filed Apr. 28, 2017 (including Appendices), the disclosure of which is hereby incorporated by reference herein in its entirety. The one or more features described in U.S. Provisional Application Ser. No. 62/491,822, filed Apr. 28, 2017 (including Appendices) can be utilized in place of and/or in addition to one or more features described herein with respect to the various embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a processing system including a processor; and
a memory storing executable instructions that, when executed by the processor, perform operations comprising:
identifying, as a first set of locations, a plurality of locations that are to receive media content;
identifying a maximum number of hops that are permitted for a given communication path from a starting wireless transceiver of the given communication path to an ending wireless transceiver of the given communication path;
identifying a maximum degree of connectivity between a given wireless transceiver and one or more other wireless transceivers; and
determining based upon the first set of locations, the maximum number of hops and the maximum degree of connectivity, a second set of locations that is a subset of the first set of locations and a third set of locations that is a subset of the first set of locations, wherein the second set of locations and the third set of locations are mutually exclusive, wherein each location of the second set of locations corresponds to a location at which to provision both an injection point for receiving a satellite signal comprising the media content and a source wireless transceiver configured to transmit the media content based upon the satellite signal, and wherein each location of the third set of locations corresponds to a location at which to provision a terminal wireless transceiver configured to receive the media content from one of the source wireless transceivers.

2. The apparatus of claim 1, wherein the injection point comprises a satellite receiver system and wherein each of the wireless transceivers comprises a WiFi transceiver.

3. The apparatus of claim 1, wherein the identifying the first set of locations comprises obtaining the first set of locations from a database.

4. The apparatus of claim 1, wherein:
the identifying the maximum number of hops comprises receiving the maximum number of hops via user input; and
the identifying the maximum degree of connectivity comprises receiving the maximum degree of connectivity via user input.

5. The apparatus of claim 1, wherein:
the operations further comprise identifying a maximum communication range between a pair of wireless transceivers; and
the determining the second set of locations and the third set of locations further comprises determining the second set of locations and the third set of locations based upon the maximum communication range.

6. The apparatus of claim 1, wherein the media content comprises a plurality of television channels.

7. The apparatus of claim 1, wherein one of the terminal wireless transceivers of the third set of locations receives the media content directly from one of the source wireless transceivers of the second set of locations.

8. The apparatus of claim 1, wherein a given one of the terminal wireless transceivers of the third set of locations receives the media content indirectly, via a relay wireless transceiver, from a given one of the source wireless transceivers of the second set of locations.

9. The apparatus of claim 8, wherein the relay wireless transceiver receives the media content from the given one of the source wireless transceivers and forwards the media content to the given one of the terminal wireless transceivers.

10. The apparatus of claim 1, wherein each location of the first set of locations comprises one of a house and an apartment.

11. A method comprising:
identifying, by a system comprising a processor, a first set of locations, wherein each location of the first set of locations corresponds to a household that is to receive media content;
identifying, by the system, a maximum communication range between a pair of wireless transceivers;
identifying, by the system, a maximum number of hops that are permitted for a given communication route from a starting wireless transceiver of the given communication route to an ending wireless transceiver of the given communication route;
identifying, by the system, a maximum degree of connectivity between a given wireless transceiver and one or more other wireless transceivers;
identifying, by the system, an availability of a split data flow, wherein a first portion of the media content is receivable at a particular wireless transceiver at a same time that a second portion of the media content is receivable from another wireless transceiver; and
determining by the system based upon the first set of locations, the maximum communication range, the maximum number of hops, the maximum degree of connectivity and the availability of the split data flow, a second set of locations and a third set of locations, wherein the second set of locations comprises a subset of the first set of locations, wherein each location of the second set of locations corresponds to a location at which to provision both a satellite receiver system and a source wireless transceiver configured to transmit some or all of the media content based upon a signal from the satellite receiver system, wherein the third set of locations comprises a subset of the first set of locations, wherein the third set of locations and the second set of locations are mutually exclusive, and wherein each location of the third set of locations corresponds to a location at which to provision a terminal wireless transceiver configured to receive some or all of the media content from each of one or more of the source wireless transceivers.

12. The method of claim 11, wherein each source wireless transceiver receives a respective signal from a respective satellite receiver system via a communication that is one of a wired communication, a wireless communication, or a combination thereof.

13. The method of claim 11, wherein each satellite receiver system comprises a satellite antenna and a satellite receiver.

14. The method of claim 11, wherein one of the terminal wireless transceivers of the third set of locations receives respective media content directly from a respective source wireless transceiver of the second set of locations.

15. The method of claim 11, wherein one of the terminal wireless transceivers of the third set of locations receives respective media content indirectly, via a relay wireless transceiver, from a respective one of the source wireless transceivers of the second set of locations.

16. The method of claim 15, wherein the relay wireless transceiver receives the respective media content from a respective source wireless transceiver and forwards the respective media content to a respective terminal wireless transceiver.

17. A non-transitory machine-readable storage medium comprising executable instructions that, when executed by a system including a processor, perform operations comprising:
identifying a first set of locations, wherein each location of the first set of locations corresponds to a household that is to receive media content;
identifying a second set of locations, wherein each location of the second set of locations corresponds to a cellular telecommunications base station that is configured to receive a satellite signal comprising the media content and to transmit the media content from the satellite signal that is received as a cellular telecommunications signal;
identifying a maximum number of hops that are permitted for a given communication route from a starting wireless transceiver of the given communication route to an ending wireless transceiver of the given communication route;
identifying a maximum degree of connectivity between a given wireless transceiver and one or more other wireless transceivers; and
determining based upon the first set of locations, the second set of locations, the maximum number of hops, and the maximum degree of connectivity, a third set of locations, a fourth set of locations and a fifth set of locations, wherein the third set of locations comprises a subset of the first set of locations, wherein each location of the third set of locations corresponds to a location at which to provision both a satellite receiver system and a source wireless transceiver configured to transmit the media content based upon a signal from the satellite receiver system, wherein the fourth set of locations comprises a subset of the first set of locations, wherein the third set of locations and the fourth set of locations are mutually exclusive, wherein each location of the fourth set of locations corresponds to a location at which to provision a terminal wireless transceiver configured to receive the media content from one of the source wireless transceivers, wherein the fifth set of locations comprises a subset of the first set of locations, and wherein each location of the fifth set of locations corresponds to a location at which a respective cellular telecommunications signal from one of the base stations is obtainable.

18. The non-transitory machine-readable storage medium of claim 17, wherein the cellular telecommunications base station comprises an LTE base station, and wherein the cellular telecommunications signal comprises an LTE signal.

19. The non-transitory machine-readable storage medium of claim 17, wherein one of the terminal wireless transceivers of the fourth set of locations receives the media content directly from one of the source wireless transceivers of the third set of locations.

20. The non-transitory machine-readable storage medium of claim 17, wherein a given one of the terminal wireless transceivers of the fourth set of locations receives the media content indirectly, via a relay wireless transceiver, from a given one of the source wireless transceivers of the third set of locations and wherein the relay wireless transceiver receives the media content from the given one of the source wireless transceivers and forwards the media content to the given one of the terminal wireless transceivers.

\* \* \* \* \*